United States Patent
Lin et al.

(10) Patent No.: US 10,186,944 B2
(45) Date of Patent: Jan. 22, 2019

(54) SWITCHING POWER SUPPLY AND THE CONTROLLER THEREOF

(71) Applicant: HANGZHOU SILAN MICROELECTRONICS CO., LTD., Hangzhou, Zhejiang (CN)

(72) Inventors: Haifeng Lin, Hangzhou (CN); Shaohua Zhang, Hangzhou (CN); Xianming Tang, Hangzhou (CN); Feng Yao, Hangzhou (CN); Yang Gao, Hangzhou (CN); Dong Wang, Hangzhou (CN); Hua Zhan, Hangzhou (CN); Xianwei Yan, Hangzhou (CN); Jianxing Wu, Hangzhou (CN)

(73) Assignee: HANGZHOU SILAN MICROELECTRONICS CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 15/305,041

(22) PCT Filed: Apr. 16, 2015

(86) PCT No.: PCT/CN2015/076734
§ 371 (c)(1),
(2) Date: Oct. 18, 2016

(87) PCT Pub. No.: WO2015/158275
PCT Pub. Date: Oct. 22, 2015

(65) Prior Publication Data
US 2017/0187275 A1 Jun. 29, 2017

(30) Foreign Application Priority Data
Apr. 18, 2014 (CN) .......................... 2014 1 0161303

(51) Int. Cl.
*H02M 3/335* (2006.01)
*H02M 1/36* (2007.01)
*H02M 1/00* (2006.01)
(Continued)

(52) U.S. Cl.
CPC ............... *H02M 1/08* (2013.01); *H02M 1/36* (2013.01); *H02M 3/33507* (2013.01);
(Continued)

(58) Field of Classification Search
CPC ......... H02M 3/33507; H02M 3/33523; H02M 1/36; H02M 2001/0006; H02M 1/08
See application file for complete search history.

(56) References Cited

U.S. PATENT DOCUMENTS 7,099,163 B1* 8/2006 Ying ...................... H02M 1/36
363/21.11
7,449,728 B2* 11/2008 Wohlmuth ........ H01L 21/82345
257/155

(Continued)

*Primary Examiner* — Timothy J Dole
*Assistant Examiner* — Sisay G Tiku
(74) *Attorney, Agent, or Firm* — Birch, Stewart, Kolasch & Birch, LLP

(57) ABSTRACT

The present invention provides a switching power supply and a controller thereof, wherein the controller comprises: a switching power supply control device having a power supply terminal and detecting a voltage at the power supply terminal; a composite device integrating therein a power transistor and a depletion transistor, wherein the power transistor has a gate coupled to a first input, a source coupled to a first output, and a drain coupled to an input signal terminal; the depletion transistor has a gate coupled to a second input, a source coupled to a second output, and a drain coupled to the input signal terminal; the first input, the second input and the second output are coupled to the switching power supply control device, the first input receives a driving signal generated by the switching power supply control device, and the input signal terminal receives (Continued)

an input signal of the switching power supply. The power transistor and the depletion transistor in the composite device may be integrated within the same composite device. The present invention can shorten the startup time of the switching power supply, effectively reduce the standby power consumption, and also reduce the cost.

40 Claims, 22 Drawing Sheets

(51) Int. Cl.
      *H03K 17/687*     (2006.01)
      *H01L 27/088*     (2006.01)
      *H02M 7/06*     (2006.01)
      *H02M 1/08*     (2006.01)

(52) U.S. Cl.
      CPC ...... *H02M 7/06* (2013.01); *H02M 2001/0032* (2013.01); *Y02B 70/16* (2013.01)

(56) References Cited

U.S. PATENT DOCUMENTS

| | | | | |
|---|---|---|---|---|
| 9,337,720 B2* | 5/2016 | Jutras | ...................... | H02M 1/36 |
| 9,742,262 B1* | 8/2017 | Jutras | ...................... | H02M 1/36 |
| 2004/0257839 A1* | 12/2004 | Yang | ................. | H02M 3/33507 |
| | | | | 363/21.12 |
| 2010/0052631 A1* | 3/2010 | Wu | ................... | H02M 3/33523 |
| | | | | 323/266 |
| 2010/0244804 A1* | 9/2010 | Zong | ....................... | H02M 1/36 |
| | | | | 323/299 |
| 2011/0019446 A1* | 1/2011 | Wu | ................... | H02M 3/33523 |
| | | | | 363/79 |
| 2012/0039096 A1* | 2/2012 | Dunipace | ................ | H02M 1/36 |
| | | | | 363/21.12 |
| 2013/0127431 A1* | 5/2013 | Ansari | ...................... | G05F 1/10 |
| | | | | 323/282 |
| 2013/0234208 A1* | 9/2013 | Bramian | ............... | H03K 17/107 |
| | | | | 257/195 |
| 2014/0092648 A1* | 4/2014 | Tang | ................ | H02M 3/33538 |
| | | | | 363/21.17 |
| 2014/0347895 A1* | 11/2014 | Tadamasa | ......... | H02M 3/33507 |
| | | | | 363/21.16 |
| 2017/0005583 A1* | 1/2017 | Choi | ................ | H02M 3/33553 |
| 2017/0194958 A1* | 7/2017 | Zhang | ................ | H03K 17/6871 |
| 2017/0222573 A1* | 8/2017 | Granig | ................... | H02M 7/06 |
| 2017/0294841 A1* | 10/2017 | Gao | .................. | H02M 3/33507 |

* cited by examiner

SWITCHING POWER SUPPLY AND THE CONTROLLER THEREOF

TECHNICAL FIELD

The present invention generally relates to techniques for switching power supplies, and more particularly to a switching power supply with high-voltage startup function and the controller thereof.

BACKGROUND

Referring to FIG. 1, it shows a topology of a typical application circuit of a prior art flyback switching power supply 100 with high-voltage startup function, which mainly includes: a startup resistor R1, a startup capacitor C1, a switching circuit 101, a switching power supply control device 102, a flyback converter 103, a diode D1, a diode D2 and an output filter capacitor C2, wherein the switching power supply control device 102 may include an ON/OFF controller 105 and a PWM controller 106.

Referring to FIG. 2, it shows a waveform schematic diagram during the high-voltage startup of the flyback switching power supply 100, including waveforms at a power supply terminal VCC of the switching power supply control device 102, an output UV_CTRL of the ON/OFF controller 105, a high-voltage startup charging current Ich of the startup capacitor C1, a gate driving terminal GD of the switching power supply control device 102, and a DC output voltage VOUT.

In connection with FIG. 1 and FIG. 2, when the switching power supply 100 initiates the high-voltage startup, an AC input voltage VIN supplies a high-voltage startup charging current Ich to the startup capacitor C1 via the startup resistor R1, and a voltage at the power supply terminal VCC of the switching power supply control device 102 starts to rise. Meanwhile, the high-voltage startup charging current Ich increases from 0, reaches a maximum value of Ich0 (Ich0>0) and then decreases. When the voltage at the power supply terminal VCC is above a turn-on voltage VCCON of the ON/OFF controller 105, an output signal UV_CTRL of the ON/OFF controller 105 transitions from low to high, and the high-voltage startup charging current Ich decreases to Ich1 (Ich1>0), then the PWM controller 106 starts to work, generating a gate driving signal GD of the switching power supply control device 102. The gate driving signal GD may be a PWM modulated signal and controls the ON/OFF of the power transistor 104 in the switching circuit 101, such that a drain E_D of the power transistor 104 provides a power output current. Accordingly, the AC input voltage VIN delivers energy to the DC output voltage VOUT via a primary winding L1 and a secondary winding L2 of the transformer in the flyback converter 103, the diode D2, and the output filter capacitor C2, causing the voltage VOUT to rise. At the same time, the AC input voltage VIN supplies power to the power supply terminal VCC via the primary winding L1 and an auxiliary winding L3 of the transformer in the flyback converter 103, the diode D1, and the startup capacitor C1, in addition to supplying power to the power supply terminal VCC of the switching power supply control device 102 via the startup resistor R1 and the startup capacitor C1. As such, the switching power supply 100 completes the high-voltage startup, and begins to work.

In the above technique for high-voltage startup via the startup resistor R1, since the current Ich1 still flows through the startup resistor R1 after the startup, there is a tradeoff between the startup time and the standby power consumption. If the startup resistor R1 has a small resistance, during the startup, the AC input voltage VIN supplies a large current to charge the startup capacitor C1 via the startup resistor R1, resulting a short startup time of the switching power supply 100, but after the startup, the large current flowing through the startup resistor R1 causes high standby power consumption for the switching power supply 100. Otherwise, if the startup resistor R1 has a large resistance, during the startup, the AC input voltage VIN supplies a small current to charge the startup capacitor C1 via the startup resistor R1, resulting a long startup time of the switching power supply 100, but after the startup, the small current flowing through the startup resistor R1 causes low standby power consumption for the switching power supply 100.

To balance the startup time and the standby power consumption, in applications, the startup resistor R1 is generally chosen at a level of M$\Omega$. Even so, when the AC input voltage VIN is at 220 VAC, the power consumption of the startup resistor R1 will be more than ten milliwatts (mW), up to hundreds of mW.

As above, the prior art switching power supply 100 which completes the high-voltage startup via the startup resistor R1 as shown in FIG. 1 can not both reduce the startup time, and decrease the standby power consumption.

Referring to FIG. 3, it shows a schematic diagram of a layout 201 of the power transistor 104 within the switching power supply 100 in FIG. 1. The power transistor 104 is a high-voltage MOS device.

In connection with FIG. 1 and FIG. 3, on the layout 201 of the high-voltage MOS device 104, a bonding pad for the gate G and a bonding pad for the source S are located on a front side, and a bonding pad of the drain D is located on a back side. The three bonding pads may function to provide a power driving output of the high-voltage MOS device 104.

Referring to FIG. 4, it shows a longitudinal cross-sectional view along a direction AA' in FIG. 3.

As shown in FIG. 4, taking an N-type device as an example, the high-voltage MOS device includes: an N-type epitaxial region 306 of the MOS transistor, wherein the epitaxial region 306 is led out by an electrode 301 to form a drain of the MOS transistor; a P-well 302 of the MOS transistor; an N-type doped region 305 of the MOS transistor; a P-type doped region 309 of the MOS transistor, wherein the P-well 302, the P-type doped region 309 and the N-type doped region 305 are shorted via an electrode 303 to form a source of the MOS transistor; and a gate 304 of the MOS transistor. With regard to the whole structure of the device, the P-well 302, the N-type doped region 305, the P-type doped region 309 and the gate 304, etc., are formed in a cell portion 308. The cell portion 308 is a current conduction region of the device, and is an active region. The power device may be formed by a multitude of cell portions 308. There is a high-voltage ring 307 outside an edge of the cell portion 308. The high-voltage ring 307 may include a plurality of P-type doped regions 310, and may correspond to the region 207 shown in FIG. 3. The internal structure and the operational principle of the above device are well known in the art, and will not be described in detail.

In connection with FIG. 1 and FIG. 4, when a voltage applied to the gate 304 is higher than a threshold voltage, the surface of the P-well 302 is inversed to form a channel, such that the source and the drain of the MOS transistor are electrically connected to provide a power output.

In the scheme of FIG. 1, the high-voltage startup of the switching power supply 100 and the power supplying for the power supply terminal VCC of the switching power supply control device 102 are performed via the resistor R1. Since a current always flows through the resistor R1, there is a tradeoff between the startup time and the standby power consumption: if the resistance of the resistor R1 is small, during the high-voltage startup, a high current is supplied to the power supply terminal VCC via the resistor R1, resulting a short startup time of the switching power supply 100, but after the high-voltage startup, the large current flowing through the resistor R1 causes high standby power consumption for the switching power supply 100; otherwise, if the resistance of the resistor R1 is large, during the high-voltage startup, a low current is supplied to the power supply terminal VCC via the resistor R1, resulting a long startup time of the switching power supply 100, but after the high-voltage startup, the small current flowing through the resistor R1 causes low standby power consumption for the switching power supply 100.

To balance the startup time and the standby power consumption, in practice, the resistor R1 is generally chosen at a level of MΩ. Even so, when the input voltage VIN is at 220 VAC, the power consumption of the resistor R1 will be more than ten mW, up to hundreds of mW.

As above, the prior art switching power supply 100 which performs the high-voltage startup of the switching power supply 100 and power supply for the power supply terminal VCC of the switching power supply control device 101 via the resistor R1 cannot both reduce the startup time, and decrease the standby power consumption.

For the problem above, there is proposed a solution in the prior art to add a depletion-mode device for startup, as shown in FIG. 5. On the basis of the existing switching power supply, the switching power supply 400 in FIG. 5 adds a high-voltage startup device 403 to expedite the high-voltage startup procedure of switching power supply 400, wherein the high-voltage startup device 403 is a depletion-mode MOS transistor. After the high-voltage startup, the high-voltage startup device 403 is turned off to reduce the standby power consumption of the switching power supply 400, thereby improving the efficiency of the switching power supply 400.

In the prior art, the high-voltage startup device 403 is used as a discrete device, primarily for high-voltage signal processing and controlling. Since the high-voltage startup device 403 is a discrete device, the switching power supply 400 needs an extra component, which increases the complexity and cost of the system.

SUMMARY

The present invention intends to solve the problem of providing a switching power supply and a controller thereof, which shorten the startup time, effectively reduce the standby power consumption, and also reduce the cost.

To solve the above technical problems, the present invention provides a switching power supply controller, comprising:

a switching power supply control device having a power supply terminal and detecting a voltage at the power supply terminal; and a composite device coupled to the switching power supply control device, wherein the composite device has a first input, an input signal terminal, a second input, a first output and a second output, the composite device integrates therein a power transistor and a depletion transistor, wherein, the power transistor has a gate coupled to the first input, a source coupled to the first output, and a drain coupled to the input signal terminal;

the depletion transistor has a gate coupled to the second input, a source coupled to the second output, and a drain coupled to the input signal terminal;

the first input, the second input and the second output are coupled to the switching power supply control device, the first input receives a driving signal generated by the switching power supply control device, and the input signal terminal receives an input signal of the switching power supply;

when the voltage at the power supply terminal is lower than a preset turn-off voltage, the switching power supply control device controls the depletion transistor in the composite device to supply a startup current to the power supply terminal; when the voltage at the power supply terminal rises above a preset turn-on voltage, the driving signal controls the power transistor in the composite device to supply a power output current to a main circuit of the switching power supply, and controls the depletion transistor in the composite device to cut off the startup current.

According to an embodiment of present invention, the composite device comprises:

an epitaxial region of a first doping type, wherein the epitaxial region acts as the drains of the power transistor and the depletion transistor;

a power transistor well region and a depletion transistor well region formed in parallel on a front side of the epitaxial region, wherein the power transistor well region and the depletion transistor well region have a second doping type opposite to the first doping type;

a power transistor doped region of the first doping type formed within the power transistor well region, wherein the power transistor doped region acts as the source of the power transistor;

the gate of the power transistor formed on the front side of the epitaxial region, wherein the gate of the power transistor covers at least a portion of the power transistor doped region and extends onto the epitaxial region outside the power transistor well region;

a depletion transistor doped region of the first doping type formed within the depletion transistor well region, wherein the depletion transistor doped region acts as the source of the depletion transistor;

a depletion transistor channel region of the first doping type located within the depletion transistor well region, wherein the depletion transistor channel region extends from a boundary of the depletion transistor well region to a boundary of the depletion transistor doped region; and the gate of the depletion transistor formed on the front side of the epitaxial region, wherein the gate of the depletion transistor covers the depletion transistor channel region and extends onto the epitaxial region outside the depletion transistor well region;

wherein the epitaxial region is shorted to a first electrode formed on a back side of the epitaxial region; the power transistor well region and the power transistor doped region are shorted via a second electrode, the depletion transistor well region and the depletion transistor doped region are shorted via a third electrode, wherein the second electrode and the third electrode are formed on the front side of the epitaxial region.

According to an embodiment of present invention, the composite device further comprises an isolator for isolating the power transistor from the depletion transistor, wherein the isolator comprises:

a floating well region of the second doping type, wherein the floating well region is formed in parallel with the power transistor well region and the depletion transistor well region on the front side of the epitaxial region, and the floating well region is located between the power transistor well region and the depletion transistor well region;

a first gate formed on the front side of the epitaxial region, wherein the first gate covers at least a portion of the floating well region and at least a portion of the power transistor well region, the first gate further covers the epitaxial region between the floating well region and the power transistor well region; and a second gate formed on the front side of the epitaxial region, wherein the second gate covers at least a portion of the floating well region and at least a portion of the depletion transistor well region, the second gate further covers the epitaxial region between the floating well region and the depletion transistor well region;

wherein the first gate and the power transistor well region are shorted, and the second gate and the depletion transistor well region are shorted.

According to an embodiment of present invention, the first gate and the first well region are shorted via the second electrode, and the second gate and the second well region are shorted via the third electrode.

According to an embodiment of present invention, the composite device further comprises an isolator for isolating the power transistor from the depletion transistor, wherein the isolator comprises:

a floating well region of the second doping type, wherein the floating well region is formed in parallel with the power transistor well region and the depletion transistor well region on the front side of the epitaxial region, and the floating well region is located between the power transistor well region and the depletion transistor well region; and a dielectric layer formed on the front side of the epitaxial region, wherein the dielectric layer covers the floating well region and extends onto the epitaxial region outside the floating well region.

According to an embodiment of present invention, the composite device further comprises an isolator for isolating the power transistor from the depletion transistor, wherein the isolator comprises:

a floating well region of the second doping type, wherein the floating well region is formed in parallel with the power transistor well region and the depletion transistor well region on the front side of the epitaxial region, and the floating well region is located between the power transistor well region and the depletion transistor well region; and a second gate formed on the front side of the epitaxial region, wherein the second gate covers at least a portion of the floating well region and at least a portion of the depletion transistor well region, the second gate further covers the epitaxial region between the floating well region and the depletion transistor well region, wherein the second gate and the depletion transistor well region are shorted.

According to an embodiment of present invention, the second gate and the depletion transistor well region are shorted via the third electrode.

According to an embodiment of present invention, the composite device further comprises an isolator for isolating the power transistor from the depletion transistor, wherein the isolator comprises:

a second gate formed on the front side of the epitaxial region, wherein the second gate covers at least a portion of the power transistor well region and at least a portion of the depletion transistor well region, the second gate further covers the epitaxial region between the power transistor well region and the depletion transistor well region, wherein the second gate and the depletion transistor well region are shorted.

According to an embodiment of present invention, the second gate and the depletion transistor well region are shorted via the third electrode.

According to an embodiment of present invention, the composite device further comprises an isolator for isolating the power transistor from the depletion transistor, wherein the isolator comprises:

a first gate formed on the front side of the epitaxial region, wherein the first gate covers at least a portion of the power transistor well region and at least a portion of the depletion transistor well region, the first gate further covers the epitaxial region between the power transistor well region and the depletion transistor well region, wherein the first gate and the power transistor well region are shorted.

According to an embodiment of present invention, the first gate and the power transistor well region are shorted via the second electrode.

According to an embodiment of present invention, the floating well region is formed with a same or different implantation process as the power transistor well region and the depletion transistor well region.

According to an embodiment of present invention, the composite device further comprises:

a first leading-out region of the second doping type formed within the power transistor well region, wherein the first leading-out region and the power transistor doped region are shorted via the second electrode; and a second leading-out region of the second doping type formed within the depletion transistor well region, wherein the second leading-out region and the depletion transistor doped region are shorted via the third electrode.

According to an embodiment of present invention, the power transistor and the depletion transistor share a common high-voltage ring.

According to an embodiment of present invention, the switching power supply control device further has a high-voltage startup source, a high-voltage startup gate and a gate driving terminal, wherein the switching power supply control device comprises:

an ON/OFF controller configured for detecting the voltage at the power supply terminal and generating a control signal based on the detection, wherein when the voltage at the power supply terminal is lower than the preset turn-off voltage, the control signal is invalid, and when the voltage at the power supply terminal is higher than the preset turn-on voltage, the control signal is valid;

a PWM controller coupled to the ON/OFF controller and the gate driving terminal, and configured to generate the driving signal when the control signal is valid, wherein the driving signal outputs via the gate driving terminal; and a high-voltage startup controller coupled to the power supply terminal, the high-voltage startup source and the high-voltage startup gate, wherein when the control signal is invalid, the high-voltage startup controller adjusts a voltage between the high-voltage startup source and the high-voltage startup gate to turn on the depletion transistor, such that the startup current flows through the high-voltage startup controller to the power supply terminal; when the control signal is valid, the high-voltage startup controller adjusts the voltage between the high-voltage startup source and the high-voltage startup gate to turn off the depletion transistor, so as to cut off the startup current.

According to an embodiment of present invention, the ON/OFF controller further generates an internal operating voltage based on the detection, wherein the internal operating voltage is passed to the high-voltage startup controller, and the high-voltage startup controller utilizes the internal operating voltage to adjust the voltage between the high-voltage startup source and the high-voltage startup gate.

According to an embodiment of present invention, the high-voltage startup controller comprises:

a charging circuit coupled to the power supply terminal, the high-voltage startup source and the high-voltage startup gate; and a charging control circuit coupled to the high-voltage startup source and the high-voltage startup gate and receiving the control signal;

wherein when the control signal is invalid, the charging control circuit adjusts the voltage between the high-voltage startup source and the high-voltage startup gate to turn on the depletion transistor, such that the startup current flows through the charging circuit to the power supply terminal; when the control signal is valid, the charging control circuit adjusts the voltage between the high-voltage startup source and the high-voltage startup gate to turn off the depletion transistor, so as to cut off the startup current.

According to an embodiment of present invention, the charging control circuit comprises:

a first diode, having an anode receiving the internal operating voltage;

a first resistor, having a first terminal coupled to a cathode of the first diode, and having a second terminal coupled to the high-voltage startup source;

a second resistor, having a first terminal coupled to the high-voltage startup source, and having a second terminal coupled to the high-voltage startup gate;

a first PNP triode, having an emitter coupled to the high-voltage startup gate, and having a base coupled to a collector of the first PNP triode; and an NMOS field effect transistor, having a drain coupled to the collector of the first PNP triode, having a source coupled to ground, and having a gate receiving the control signal output by the ON/OFF controller;

wherein the charging circuit comprises:

a second PNP triode, having an emitter coupled to the high-voltage startup source, and having a base coupled to a collector of the second PNP triode;

a third PNP triode, having an emitter coupled to the high-voltage startup source, and having a base coupled to the base of the second PNP triode;

a second diode, having an anode coupled to the collector of the second PNP triode, and having a cathode coupled to the power supply terminal;

a PMOS field effect transistor, having a gate coupled to the power supply terminal, and having a source coupled to the collector of the third PNP triode;

the second resistor;

a third resistor, having a first terminal coupled to the drain of the PMOS field effect transistor, and having a second terminal coupled to ground;

the first PNP triode; and a NPN triode, having a base coupled to the drain of the PMOS field effect transistor, having a collector coupled to the collector of the first PNP triode, and having an emitter coupled to ground.

According to an embodiment of present invention, the high-voltage startup controller comprises:

a first resistor, having a first terminal coupled to the high-voltage startup source;

a first NPN triode, having a collector coupled to a second terminal of the first resistor, and having a base coupled to the second terminal of the first resistor;

a second NPN triode, having a collector coupled to the emitter of the first NPN triode, and having a base coupled to the emitter of the first NPN triode;

a third NPN triode, having a collector coupled to the emitter of the second NPN triode, having a base coupled to the emitter of the second NPN triode, and having an emitter coupled to the power supply terminal;

a first PMOS field effect transistor, having a drain coupled to the emitter of the first NPN triode, and having a source coupled to the power supply terminal;

a second PMOS field effect transistor, having a source coupled to the power supply terminal, and having a gate receiving the control signal output by the ON/OFF controller;

a third PMOS field effect transistor, having a source coupled to the power supply terminal, and having a gate coupled to the drain of the second PMOS field effect transistor;

a fourth PMOS field effect transistor, having a source coupled to the power supply terminal, having a gate coupled to the drain of the third PMOS field effect transistor, and having a drain coupled to the high-voltage startup gate;

a first NMOS field effect transistor, having a drain coupled to the drain of the second PMOS field effect transistor, having a gate receiving the control signal output by the ON/OFF controller, and having a source coupled to ground;

a second NMOS field effect transistor, having a drain coupled to the drain of the third PMOS field effect transistor, having a gate coupled to the gate of the third PMOS field effect transistor, and having a source coupled to ground; and a third NMOS field effect transistor, having a drain coupled to the drain of the fourth PMOS field effect transistor, having a gate coupled to the drain of the fourth PMOS field effect transistor, and having a source coupled to ground.

According to an embodiment of present invention, the switching power supply control device further has a constant current sampling terminal, wherein the switching power supply control device further comprises:

a constant current controller coupled to the constant current sampling terminal and the PWM controller, for sampling the power output current flowing through the power transistor via the constant current sampling terminal and generating a constant current control signal, wherein the PWM controller generates the driving signal based on the constant current control signal to achieve a constant current output.

According to an embodiment of present invention, the composite device further has a third output, and the composite device further integrates therein a sampling transistor, wherein the sampling transistor has a drain coupled to the input signal terminal, a gate coupled to the gate of the power transistor, and a source coupled to the third output;

wherein the switching power supply control device further has a peak sampling terminal coupled to the third output, wherein the switching power supply control device further comprises:

a peak controller coupled to the peak sampling terminal and the PWM controller, for sampling a peak current flowing through the power transistor via the peak sampling terminal and generating a peak control signal, wherein the PWM controller generates the driving signal based on the peak control signal to achieve peak control.

According to an embodiment of present invention, the composite device comprises:

an epitaxial region of the first doping type, wherein the epitaxial region acts as the drains of the power transistor, the depletion transistor and the sampling transistor;

a power transistor well region, a depletion transistor well region and a sampling transistor well region formed in parallel on the front side of the epitaxial region, wherein the power transistor well region, the depletion transistor well region and the sampling transistor well region have a second doping type opposite to the first doping type;

a power transistor doped region of the first doping type formed within the power transistor well region, wherein the power transistor doped region acts as the source of the power transistor;

the gate of the power transistor formed on the front side of the epitaxial region, wherein the gate of the power transistor covers at least a portion of the power transistor doped region and extends onto the epitaxial region outside the power transistor well region;

a depletion transistor doped region of the first doping type formed within the depletion transistor well region, wherein the depletion transistor doped region acts as the source of the depletion transistor;

a depletion transistor channel region of the first doping type located within the depletion transistor well region, wherein the depletion transistor channel region extends from a boundary of the depletion transistor well region to a boundary of the depletion transistor doped region;

the gate of the depletion transistor formed on the front side of the epitaxial region, wherein the gate of the depletion transistor covers the depletion transistor channel region and extends onto the epitaxial region outside the depletion transistor well region;

a sampling transistor doped region of the first doping type formed within the sampling transistor well region, wherein the sampling transistor doped region acts as the source of the sampling transistor;

the gate of the sampling transistor formed on the front side of the epitaxial region, wherein the gate of the sampling transistor covers at least a portion of the sampling transistor doped region and extends onto the epitaxial region outside the sampling transistor well region;

wherein the epitaxial region is shorted to a first electrode formed on a back side of the epitaxial region; the power transistor well region and the power transistor doped region are shorted via a second electrode, the depletion transistor well region and the depletion transistor doped region are shorted via a third electrode, the sampling transistor well region and the sampling transistor doped region are shorted via a fourth electrode, wherein the second electrode, the third electrode and the fourth electrode are formed on the front side of the epitaxial region.

According to an embodiment of present invention, the power transistor is an enhancement-mode MOS transistor, and the depletion transistor is a depletion-mode MOS transistor.

The present invention also provides a switching power supply, comprising:

any of the switching power supply controller above; and a main circuit coupled to the switching power supply controller.

According to an embodiment of present invention, the switching power supply controller is the switching power supply controller of any of claims 1-19, and the main circuit has a flyback structure or a boost structure.

According to an embodiment of present invention, wherein the main circuit comprises:

a transformer, having a primary winding with a dotted terminal receiving the input signal of the switching power supply, and with a synonym terminal coupled to the output signal terminal of the composite device;

an output rectifier diode, having an anode coupled to a synonym terminal of a secondary winding of the transformer, and having a cathode coupled to an output of the switching power supply;

an output filter capacitor, having a first terminal coupled to the cathode of the output rectifier diode, and having a second terminal coupled to the dotted terminal of the secondary winding and to ground;

an auxiliary winding diode, having an anode coupled to a synonym terminal of an auxiliary winding of the transformer, and having a cathode coupled to the power supply terminal, wherein a dotted terminal of the auxiliary winding is coupled to ground; and a startup capacitor, having a first terminal coupled to the power supply terminal, and having a second terminal coupled to ground.

According to an embodiment of present invention, when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by the input signal of the switching power supply via the primary winding and the auxiliary winding of the transformer, the auxiliary winding diode and the startup capacitor, to complete the startup of the switching power supply.

According to an embodiment of present invention, the main circuit comprises:

an inductor, having a first terminal coupled to an output of the switching power supply, and having a second terminal coupled to a ground terminal of the switching power supply control device in the switching power supply controller and to the first output of the composite device;

a first diode, having an anode coupled to the first terminal of the inductor;

a second diode, having an anode coupled to a cathode of the first diode, and having a cathode coupled to the power supply terminal;

a first capacitor, having a first terminal coupled to the cathode of the first diode, and having a second terminal coupled to the second terminal of the inductor;

a second capacitor, having a first terminal coupled to the power supply terminal, and having a second terminal coupled to the second terminal of the inductor;

a third diode, having a cathode coupled to the second terminal of the inductor, and having an anode coupled to ground; and a third capacitor, having a first terminal coupled to the output of the switching power supply, and having a second terminal coupled to ground.

According to an embodiment of present invention, when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by the output of the switching power supply via the first diode, the first capacitor, the second diode and the second capacitor, to complete the startup of the switching power supply.

According to an embodiment of present invention, the switching power supply controller is the switching power supply controller of claim 20, and the main circuit comprises:

According to an embodiment of present invention, a transformer, having a primary winding with a dotted terminal receiving the input signal of the switching power supply, and with a synonym terminal coupled to the input signal terminal of the composite device;

an output rectifier diode, having an anode coupled to a synonym terminal of a secondary winding of the transformer, and having a cathode coupled to an output of the switching power supply;

an output filter capacitor, having a first terminal coupled to the cathode of the output rectifier diode, and having a second terminal coupled to the dotted terminal of the secondary winding and to ground;

an auxiliary winding diode, having an anode coupled to a synonym terminal of an auxiliary winding of the transformer, and having a cathode coupled to the power supply terminal, wherein a dotted terminal of the auxiliary winding is coupled to ground;

a startup capacitor, having a first terminal coupled to the power supply terminal, and having a second terminal coupled to ground; and a sampling resistor, having a first terminal coupled to the first output of the composite device and to the constant current sampling terminal of the switching power supply control device, and having a second terminal coupled to a ground terminal of the switching power supply control device and to ground.

According to an embodiment of present invention, when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by the input signal of the switching power supply via the primary winding and the auxiliary winding of the transformer, the auxiliary winding diode and the startup capacitor, to complete the startup of the switching power supply.

According to an embodiment of present invention, the switching power supply controller is the switching power supply controller of claim 20, and the main circuit comprises:

an input diode, having a cathode receiving the input signal of the switching power supply, and an anode coupled to the input signal terminal of the composite device;

a transformer, having a primary winding with a synonym terminal coupled to the input signal terminal of the composite device;

a secondary winding diode, having an anode coupled to a synonym terminal of a secondary winding of the transformer, and having a cathode coupled to the power power supply terminal, wherein a dotted terminal of the secondary winding is coupled to ground;

an output filter capacitor, having a first terminal coupled to the cathode of the input diode, and having a second terminal coupled to a dotted terminal of the primary winding of the transformer;

a startup capacitor, having a first terminal coupled to the power power supply terminal, and having a second terminal coupled to ground; and a sampling resistor, having a first terminal coupled to the first output of the composite device and to the constant current sampling terminal of the switching power supply control device, and having a second terminal coupled to a ground terminal of the switching power supply control device and to ground.

According to an embodiment of present invention, when the switching power supply initiates the startup, the voltage at the power power supply terminal is lower than the preset turn-off voltage, and the composite device in the switching power supply controller supplies the startup current to the power power supply terminal, such that the voltage at the power power supply terminal rises; when the voltage at the power power supply terminal rises above the preset turn-on voltage, the composite device in the switching power supply controller cuts off the startup current, and the power power supply terminal is powered instead by the output of the switching power supply via the primary winding and the secondary winding of the transformer, the secondary winding diode and the startup capacitor, to complete the startup of the switching power supply.

According to an embodiment of present invention, the switching power supply controller is the switching power supply controller of claim 20, and the main circuit comprises:

a sampling resistor, having a first terminal coupled to the first output of the composite device and to a ground terminal of the switching power supply device, and having a second terminal coupled to the constant current sampling terminal of the switching power supply control device;

a transformer, having a primary winding with a dotted terminal coupled to the second terminal of the sampling resistor;

a secondary winding diode, having an anode coupled to a synonym terminal of a secondary winding of the transformer;

a first resistor, having a first terminal coupled to a cathode of the secondary winding diode, and having a second terminal coupled to the power power supply terminal;

a first capacitor, having a first terminal coupled to the second terminal of the first resistor;

an output rectifier diode, having a cathode coupled to a second terminal of the first capacitor, the first terminal of the sampling resistor and a dotted terminal of the secondary winding, and having an anode coupled to ground; and an output filter capacitor, having a first terminal coupled to a synonym terminal of the primary winding of the transformer, and having a second terminal coupled to ground.

According to an embodiment of present invention, when the switching power supply initiates the startup, the voltage at the power power supply terminal is lower than the preset turn-off voltage, and the composite device in the switching power supply controller supplies the startup current to the power power supply terminal, such that the voltage at the power power supply terminal rises; when the voltage at the power power supply terminal rises above the preset turn-on voltage, the composite device in the switching power supply controller cuts off the startup current, and the power power supply terminal is powered instead by the output of the switching power supply via the primary winding and the secondary winding of the transformer, the secondary winding diode, the first resistor and the first capacitor, to complete the startup of the switching power supply.

According to an embodiment of present invention, the switching power supply controller is the switching power supply controller of claim 20, and the main circuit comprises:

a sampling resistor, having a first terminal coupled to the first output of the composite device and to a ground terminal of the switching power supply device, and having a second terminal coupled to the constant current sampling terminal of the switching power supply control device;

a transformer, having a primary winding with a dotted terminal coupled to the second terminal of the sampling resistor and with a synonym terminal coupled to ground;

a secondary winding diode, having an anode coupled to a synonym terminal of a secondary winding of the transformer, wherein a dotted terminal of the secondary winding is coupled to the first terminal of the sampling resistor;

a first resistor, having a first terminal coupled to a cathode of the secondary winding diode, and having a second terminal coupled to the power power supply terminal;

a first capacitor, having a first terminal coupled to the second terminal of the first resistor, and having a second terminal coupled to the first terminal of the sampling resistor;

an output rectifier diode, having a cathode coupled to the dotted terminal of the secondary winding; and an output filter capacitor, having a first terminal coupled to an anode of the output rectifier diode, and having a second terminal coupled to ground.

According to an embodiment of present invention, when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by the output of the switching power supply via the output rectifier diode, the sampling resistor, the primary winding and the secondary winding of the transformer, the secondary winding diode, the first resistor and the first capacitor, to complete the startup of the switching power supply.

According to an embodiment of present invention, the switching power supply controller is the switching power supply controller of claim 21 or 22, and the main circuit comprises:

a transformer, having a primary winding with a dotted terminal receiving the input signal of the switching power supply, and with a synonym terminal coupled to the input signal terminal of the composite device;

an output rectifier diode, having an anode coupled to a synonym terminal of a secondary winding of the transformer, and having a cathode coupled to an output of the switching power supply;

an output filter capacitor, having a first terminal coupled to the cathode of the output rectifier diode, and having a second terminal coupled to the dotted terminal of the secondary winding and to ground;

an auxiliary winding diode, having an anode coupled to a synonym terminal of an auxiliary winding of the transformer, and having a cathode coupled to the power supply terminal, wherein a dotted terminal of the auxiliary winding is coupled to ground; and a startup capacitor, having a first terminal coupled to the power supply terminal, and having a second terminal coupled to ground.

According to an embodiment of present invention, when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the switching circuit in the switching power supply controller cuts off the startup current, and the power supply terminal is powered instead by the input signal of the switching power supply via the primary winding and the auxiliary winding of the transformer, the auxiliary winding diode and the startup capacitor, to complete the startup of the switching power supply.

As compared with the prior art, present invention has the following advantages:

The switching power supply according to an embodiment of present invention comprises a switching power supply control device and a composite device, wherein a power transistor and a depletion transistor are integrated in the composite device. During the high-voltage startup, the depletion transistor is turned on to supply a large high-voltage startup charging current to the power supply terminal, so as to reduce the startup time of the switching power supply and expedite the startup procedure. After the switching power supply completes the high-voltage startup, the depletion transistor is turned off and stops supplying the high-voltage startup charging current to the power supply terminal, so as to reduce the standby power consumption of the switching power supply, and improve the efficiency of the switching power supply.

Further, in the switching power supply controller according to an embodiment of present invention, the composite device integrates the power transistor and the depletion transistor in the same device, which helps to reduce the chip area, thereby further reducing the cost.

BRIEF DESCRIPTION OF THE DRAWINGS

FIG. 9 is a cross-sectional view along a direction BB' of the composite device in

FIG. 8;

DETAILED DESCRIPTION

The present invention is further described in conjunction with the following specific embodiments and the drawings, although the scope of present invention is not so limited.

Figure 1:
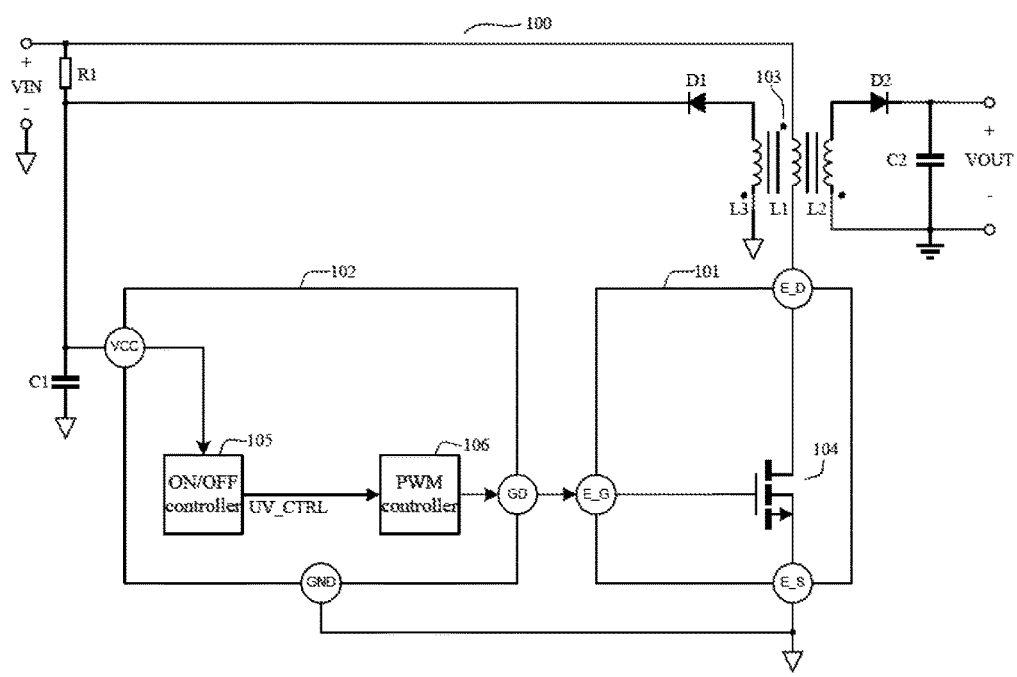
FIG. 1 is a circuit schematic diagram of a prior art flyback switching power supply.
Figure 2:
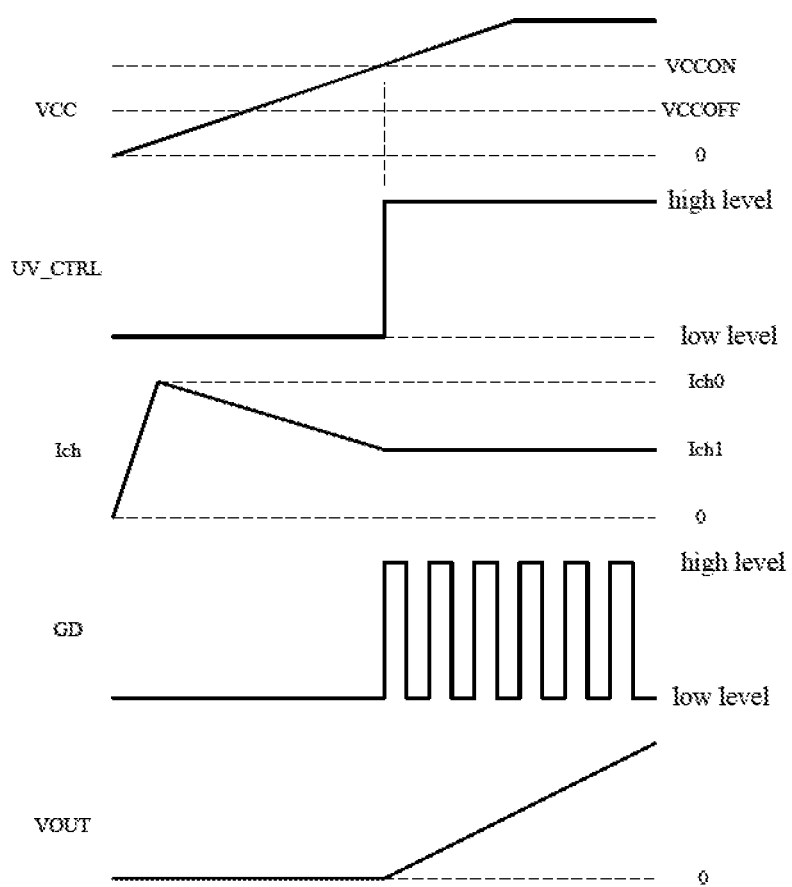
FIG. 2 is a signal waveform schematic diagram during high-voltage startup of the flyback switching power supply shown in FIG. 1.
Figure 3:
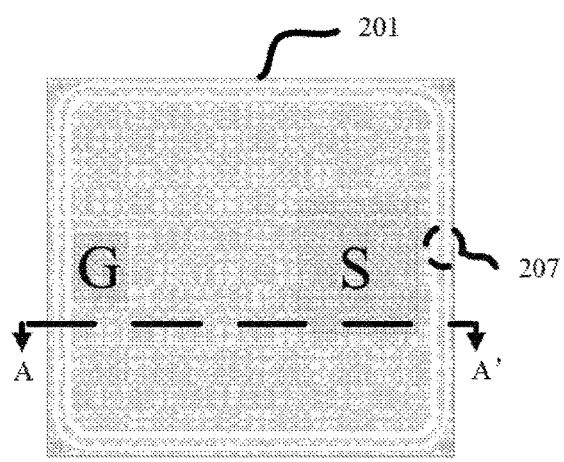
FIG. 3 is a layout schematic diagram of a power transistor in the switching circuit of the flyback switching power supply shown in FIG. 1.
Figure 4:
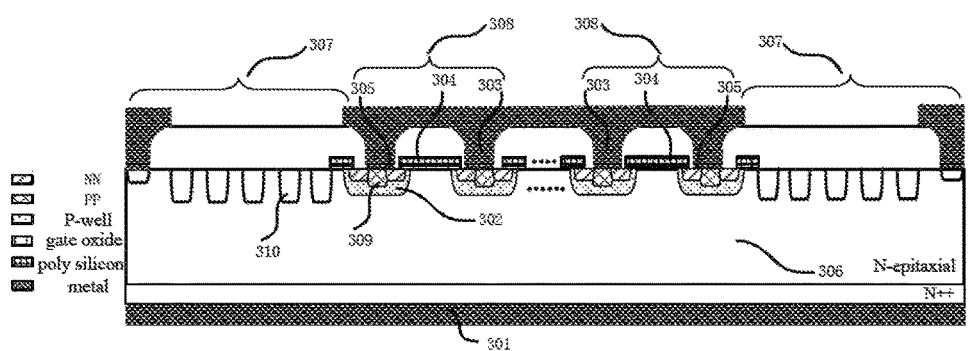
FIG. 4 is a cross-sectional view along a direction AA' of the power transistor in the switching circuit shown in FIG. 3.
Figure 5:
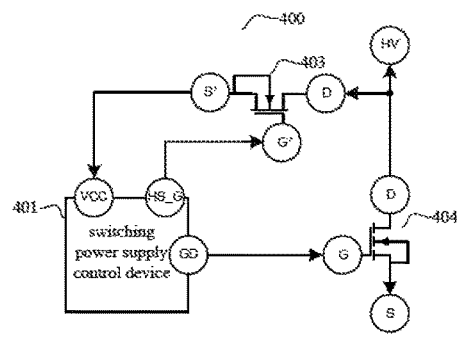
FIG. 5 is a circuit schematic diagram of another switching power supply in the prior art.
Figure 6:
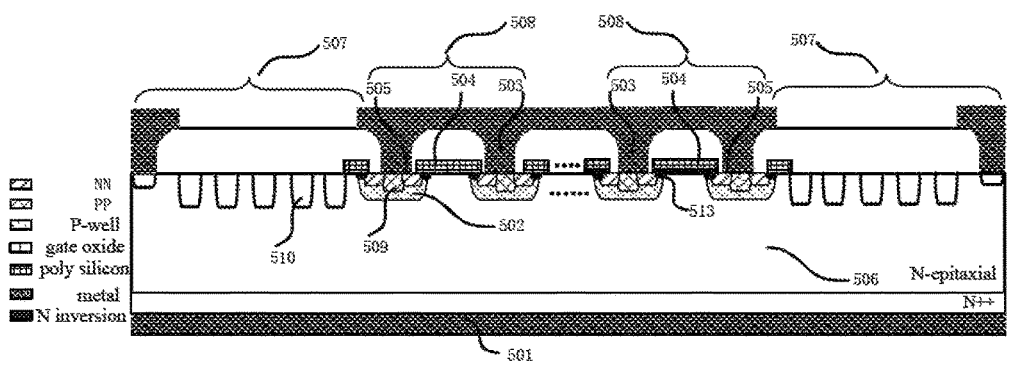
FIG. 6 is a cross-sectional view of a depletion-mode MOS device in the prior art.

An enhancement-mode MOS device in the prior art is shown in FIG. 4. A depletion-mode MOS device in the prior art is shown in FIG. 6, including a cell portion 508 and a high-voltage ring 507 on the periphery of the cell portion 508, wherein the cell portion 508 is an active region. Further, taking an N-type device as an example, the depletion-mode MOS device includes: an N-type doped epitaxial region 506, which is shorted to an electrode 501 to form a drain of the depletion-mode MOS device; a P-type well region 502; an N-type doped region 505 formed in the P-type well region 502; a P-type doped region 509 formed in the P-type well region 502, wherein the P-type doped region 509, the N-type doped region 505 and the P-type well region 502 are shorted via an electrode 503 to form a source of the depletion-mode MOS device; a gate 504 on the epitaxial region 506; a N-type channel region 513 located between the N-type doped region 505 and the P-type well region 502 and formed on a surface of the P-type well region 502. When the gate voltage is at zero volt, due to the presence of the N-type channel region 513, a conductive channel is formed. When there is a voltage difference between the drain and the source, a current is formed between the drain and the source and flows out of the channel, so as to turn on the device. When the gate voltage is negative and lower than a threshold voltage of the depletion-mode MOS device, the N-type channel region 513 is inversed, and the channel is turned off, so as to turn off the device. When the device is turned off and a high voltage is applied to the drain, the depletion layers of the P-type well region 502 within the cell portion 508 are coupled to each other to achieve a high withstand voltage. At the edge of the cell portion 508, since the curvature of the P-type well region 502 is decreased, it requires the high-voltage ring 507 to extend the depletion layer to endure the voltage applied on the drain, such that the device has a high reverse breakdown voltage and good reliability. The high-voltage ring 507 may include a plurality of P-type doped region 510.

As can be seen from FIG. 4 and FIG. 6, the enhancement-mode MOS device and the depletion-mode MOS device are mostly similar in structure, except that a channel region 513 is added in the depletion-mode MOS device. In an embodiment of present invention, a part of the gate region and the source region is isolated in the enhancement-mode MOS device, wherein an inversed channel region is added on a surface of the P-type well region in the isolated region, such that the enhancement-mode MOS device and the depletion-mode MOS device may be formed within the same epitaxial region, so as to be integrated in one same composite device.

Further description is presented below in conjunction with various different embodiments.

First Embodiment

Figure 7:
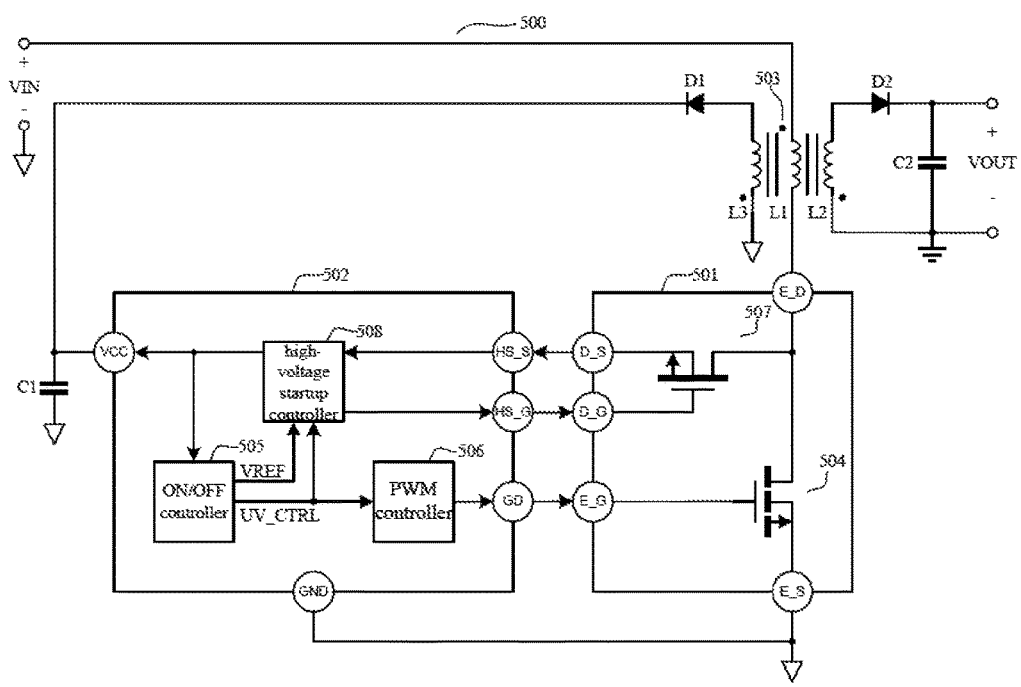
FIG. 7 is a circuit schematic diagram of a flyback switching power supply according to a first embodiment of present invention.

Referring to FIG. 7, it shows a circuit diagram of a switching power supply 500 with high-voltage startup function according to a first embodiment. The switching power supply 500 includes a switching power supply controller and a main circuit coupled thereto, wherein the switching power supply controller includes a composite device 501 and a switching power supply control device 502. The main circuit may have a flyback structure.

The composite device 501 is used for providing a power output current and a high-voltage startup charging current for the flyback switching power supply 500. The composite device 501 may integrate therein a power transistor 504 and a depletion transistor 507, wherein the power transistor 504 may be an N-type enhancement-mode MOS transistor, and the depletion transistor 507 may be an N-type depletion-mode MOS transistor.

The power transistor 504 has a gate coupled to a first input E_G of the composite device 501; the power transistor 504 has a source coupled to a first output E_S of the composite device 501; the power transistor 504 has a substrate coupled to the source of the power transistor 504; and the power transistor 504 has a drain coupled to an input signal terminal E_D of the composite device 501. The depletion transistor 507 has a gate coupled to a second input D_G of the composite device 501; the depletion transistor 507 has a source coupled to a second output D_S of the composite device 501; the depletion transistor 507 has a substrate coupled to the source of the depletion transistor 507; and the depletion transistor 507 has a drain coupled to the input signal terminal E_D of the composite device 501. The first output E_S of the composite device 501 is coupled to ground.

The power transistor 504 is used for providing the power output current for the flyback switching power supply 500, more specifically, providing the power output current to the main circuit of the flyback switching power supply 500. When a voltage difference Vgs between the gate and the source of the power transistor 504 is above a threshold voltage Vth1 (e.g., Vth1>0V) of the power transistor 504, the power transistor 504 is turned on, and the drain of the power transistor 504 provides the power output current via the input signal terminal E_D of the composite device 501; when the voltage difference Vgs between the gate and the source of the power transistor 504 is below the threshold voltage Vth1 (e.g., Vth1>0V) of the power transistor 504, the power transistor 504 is turned off, and the drain of the power transistor 504 stops providing the power output current via the input signal terminal E_D of the composite device 501.

The depletion transistor 507 is primarily used for providing a startup current during the high-voltage startup of the flyback switching power supply 500, wherein the startup current is the high-voltage startup charging current. When a voltage difference Vgs between the gate and the source of the depletion transistor 507 is above a threshold voltage Vth2 (e.g., Vth2<0V) of the depletion transistor 507, the depletion transistor 507 is turned on, and the drain of the depletion transistor 507 provides the high-voltage startup charging current via the source; and when the voltage difference Vgs between the gate and the source of the depletion transistor 507 is below the threshold voltage Vth2 (e.g., Vth2<0V) of the depletion transistor 507, the depletion transistor 507 is turned off, and the drain of the depletion transistor 507 stops providing the high-voltage startup charging current via the source.

The switching power supply control device 502 detects a voltage at the power supply terminal VCC to determine a status of the flyback switching power supply 500, so as to control the ON/OFF of the composite device 501. The switching power supply control device 502 may include an ON/OFF controller 505, a PWM controller 506, and a high-voltage startup controller 508.

In particular, the power supply terminal VCC of the switching power supply control device 502 is coupled to an input of the ON/OFF controller 505 and an output of the high-voltage startup controller 508; an output VREF of the ON/OFF controller 505 is coupled to an input of the high-voltage startup controller 508; an output UV_CTRL of the ON/OFF controller 505 is coupled to an input of the PWM controller 506 and an input of the high-voltage startup controller 508; an output of the PWM controller 506 is coupled to a gate driving terminal GD of the switching power supply control device 502, wherein the gate driving terminal GD is further coupled to the first input E_G of the composite device 501, and is in turn coupled to the gate of the power transistor 504; an input of the high-voltage startup controller 508 is coupled to a high-voltage startup source HS_S of the switching power supply control device 502, wherein the high-voltage startup source HS_S is further coupled to the second output D_S of the composite device 501, and is in turn coupled to the source of the depletion transistor 507; an output of the high-voltage startup controller 508 is coupled to a high-voltage startup gate HS_G of the switching power supply control device 502, wherein the high-voltage startup gate HS_G is further coupled to the second input D_G of the composite device 501, and is in turn coupled to the gate of the depletion transistor 507; a ground terminal GND of the switching power supply control device 502 is coupled to ground.

The ON/OFF controller 505 determines whether the switching power supply control device 502 should operate, based on the voltage at the power supply terminal VCC of the switching power supply control device 502. When the voltage at the power supply terminal VCC is above a turn-on voltage VCCON of the ON/OFF controller 505, a control signal output by the output UV_CTRL of the ON/OFF controller 505 transitions from invalid to valid, e.g., from low to high, then the switching power supply control device 502 operates normally, and the output VREF of the ON/OFF controller 505 provides the internal operating voltage VREF2 (e.g., VREF2>0). When the voltage at the power supply terminal VCC is below a turn-off voltage VCCOFF of the ON/OFF controller 505, the output UV_CTRL of the ON/OFF controller 505 transitions from valid to invalid, e.g., from high to low, then the switching power supply control device 502 is turned off and does not work, and the output VREF of the ON/OFF controller 505 provides the internal operating voltage VREF1 (e.g, VREF1=0).

The PWM controller 506 is used for generating a driving signal to control the ON/OFF of the power transistor 504. As a preferred embodiment, the PWM controller 506 may perform the PWM control of the switching power supply 500, and output the driving signal as a PWM modulated signal. When the output signal UV_CTRL of the ON/OFF controller 505 transitions from invalid to valid, e.g., from low to high, the PWM controller 506 operates normally, generating the PMW modulated signal and outputting the PMW modulated signal via the gate driving terminal GD of the switching power supply control device 502, to control the ON/OFF of the power transistor 504 in the composite device 501. When the output signal UV_CTRL of the ON/OFF controller 505 transitions from valid to invalid, e.g., from high to low, the PWM controller 506 is turned off and does not work, for example, the gate driving terminal GD of the switching power supply control device 502 may be at a low level, so as to turn off the power transistor 504 in the composite device 501.

The high-voltage startup controller 502 controls the high-voltage startup of the switching power supply 500. When the output UV_CTRL of the ON/OFF controller 505 is invalid (e.g., UV_CTRL is low) and the output VREF is VREF1 (e.g., VREF1=0), the high-voltage startup controller 508 controls the voltage difference Vgs between the high-voltage startup gate HS_G and the high-voltage startup source HS_S as −VREF1 (e.g., VREF1=0) which is higher than the threshold voltage Vth2 (e.g., Vth2<0V) of the depletion transistor 507 in the composite device 501, then the depletion transistor 507 is turned on, and the input signal terminal E_D of the composite device 501 supplies the high-voltage startup charging current Ich to the power supply terminal VCC via the depletion transistor 507 and the high-voltage startup controller 508, for example, Ich increases from 0 to Ich2 (e.g., Ich2>0). When the control signal at the output UV_CTRL of the ON/OFF controller 505 is valid (e.g., UV_CTRL is high) and the output signal VREF is VREF2 (e.g., VREF2>0), the high-voltage startup controller 508 controls the voltage difference Vgs between the high-voltage startup gate HS_G and the high-voltage startup source HS_S as −VREF2 (e.g., VREF2>0), which is lower than the threshold voltage Vth2 (e.g., Vth2<0V) of the depletion transistor 507, then the depletion transistor 507 is turned off, and the input signal terminal E_D of the composite device 501 stops providing the high-voltage startup charging current Ich to the power supply terminal VCC via the depletion transistor 507 and the high-voltage startup controller 508, for example, Ich transitions from Ich2 (e.g., Ich2>0) to 0.

The main circuit converts an input signal VIN to an output voltage VOUT. The input signal VIN may be an AC signal, and the output voltage VOUT may be a DC signal. The main circuit includes a primary winding L1 of a flyback transformer, a secondary winding L2 of the flyback transformer, an output rectifier diode D1, an output filter capacitor C2, an auxiliary winding L3 of the flyback transformer, an auxiliary winding diode D2, and a startup capacitor C1.

The input signal VIN is passed to the dotted terminal of the primary winding L1. The synonym terminal of the primary winding L1 is coupled to the input signal terminal E_D of the composite device 501. The dotted terminal of the secondary winding L2 is coupled to ground, and the synonym terminal of the secondary winding L2 is coupled to the anode of the output rectifier diode D1. The cathode of the output rectifier diode D1 is coupled to one terminal of the output filter capacitor C2, and acts as the output of the switching power supply 500 to output the output voltage VOUT. The other terminal of the output filter capacitor C2 is coupled to ground. The dotted terminal of the auxiliary winding L3 is coupled to ground, and the synonym terminal of the auxiliary winding L3 is coupled to the anode of the auxiliary winding diode D2. The cathode of the auxiliary winding diode D2 is coupled to one terminal of the startup capacitor C1 and to the power supply terminal VCC of the switching power supply control device 502. The other terminal of the startup capacitor C1 is coupled to ground.

In addition, the connection for the substrates of the power transistor 504 and the depletion transistor 507 in the composite device 501 may vary, with other connections unchanged. For example, the power transistor 504 may have its substrate being coupled to its source, and the substrate of the depletion transistor 507 may be coupled to the substrate of the power transistor 504.

However, it should be noted that, the connection for the substrates of the power transistor 504 and the depletion transistor 507 in the composite device 501 as shown in FIG. 7 is a preferred implementation. As compared with the implementation where the power transistor 504 has its substrate being coupled to its source, and the substrate of the depletion transistor 507 is coupled to the substrate of the power transistor 504, the connection shown in FIG. 7 reduces the voltage difference between the substrate and the source of the depletion transistor 507, thereby mitigating the substrate biasing effect of the depletion transistor 507. Consequently, the threshold voltage to turn on the depletion transistor 507 may be decreased, which is beneficial for improving the performance of the whole switching power supply.

Figure 8:
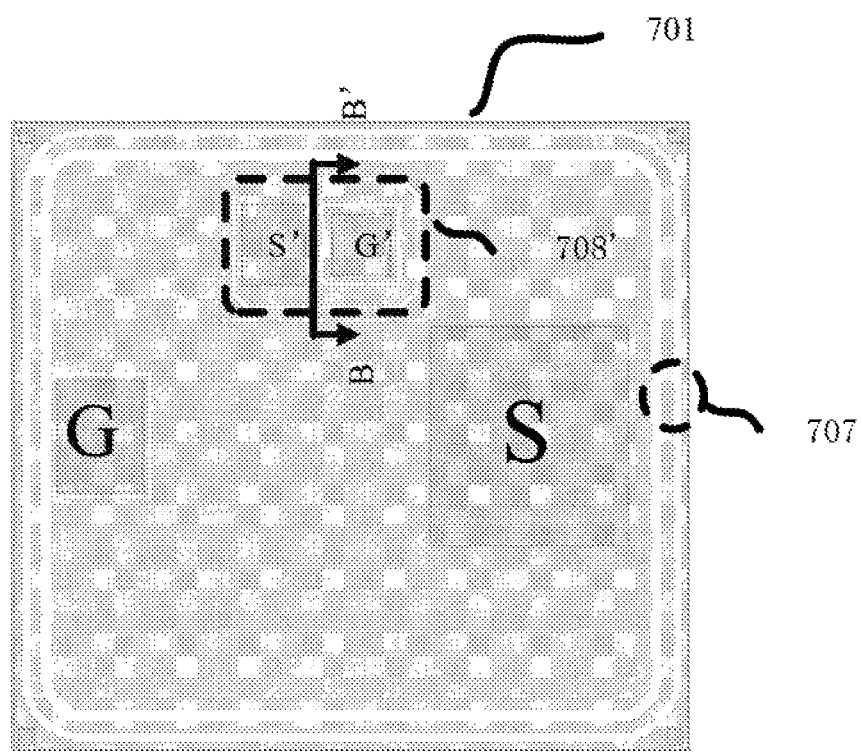
FIG. 8 is a layout schematic diagram of a first instance of a composite device in the flyback switching power supply according to the first embodiment of present invention.
Figure 9:
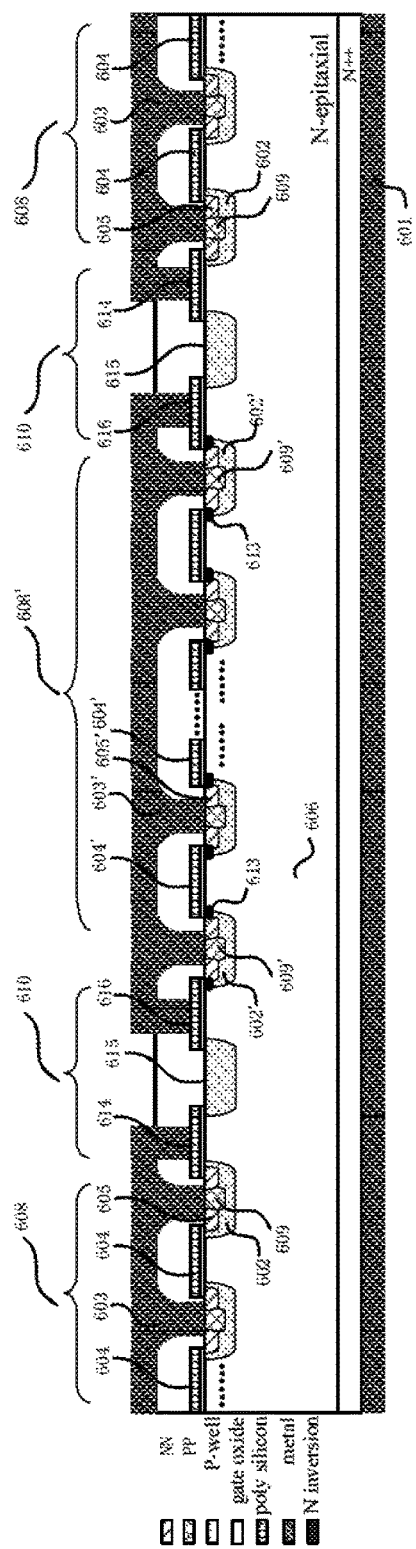

Referring to FIG. 7, FIG. 8 and FIG. 9, the power transistor 504 and the depletion transistor 507 may be integrated in the same composite device. In other words, the depletion transistor 507 may be integrated on the power transistor 504, to reduce the chip area of the switching power supply 500, thereby reducing the cost of the switching power supply 500.

The power transistor 504 in this embodiment may be an enhancement-mode MOS transistor, and the depletion transistor 507 may be a depletion-mode MOS transistor. Taking an N-type device as an example, the power transistor 504 is an N-type enhancement-mode MOS transistor, and the depletion transistor 507 is an N-type depletion-mode MOS transistor. Accordingly, the first doping type may be N-type doping, and the second doping type may be P-type.

Furthermore, the power transistor 504 in the first embodiment is an enhancement-mode VDMOS device.

Referring to FIG. 8, it shows a cross-sectional view of a first instance of the composite device in the switching power supply according to the first embodiment, wherein a power transistor and a depletion transistor are integrated in one same composite device.

The composite device includes a cell portion 608 of the power transistor and a cell portion 608' of the depletion transistor, wherein both cell portions are active regions. Taking an N-type device as an example, the composite device may include:

an N-type doped epitaxial region 606 having a first electrode 601 on a back side thereof, wherein the epitaxial region 606 is shorted to the first electrode 601 to form the drains of the power transistor and the depletion transistor;

a power transistor well region 602 and a depletion transistor well region 602' of P-type doping, formed on a front side of the epitaxial region 606;

an N-type doped power transistor doped region 605 formed in the power transistor well region 602;

an N-type doped depletion transistor doped region 605' formed in the depletion transistor well region 602';

an N-type doped channel region 613 within the depletion transistor well region 602', wherein the channel region 613 extends from a boundary of the depletion transistor well region 602' to a boundary of the depletion transistor doped region 605';

a gate 604 of the power transistor formed on the front side of the epitaxial region 606, wherein the gate 604 of the power transistor covers at least a portion of the power transistor doped region 605 and extends onto the epitaxial region 606 outside the power transistor well region 602;

a gate 604' of the depletion transistor formed on the front side of the epitaxial region 606, wherein the gate 604' of the depletion transistor covers the channel region 613 and extends onto the epitaxial region 606 outside the depletion transistor well region 602';

a first P-type doped leading-out region 609, which is formed in parallel with the power transistor doped region 605 within the power transistor well region 602; and a second P-type doped leading-out region 609', which is formed in parallel with the depletion transistor doped region 605' within the depletion transistor well region 602'.

The power transistor well region 602, the first leading-out region 609 and the power transistor doped region 605 are shorted via a second electrode 603, to form the source of the power transistor. The depletion transistor well region 602', the second leading-out region 609' and the depletion transistor doped region 605' are shorted via a third electrode 603', to form the source of the depletion transistor.

As a non-limiting instance, the gate 604 of the power transistor and the gate 604' of the depletion transistor may each include a gate dielectric layer and a gate electrode on the gate dielectric layer. The gate electrode may be a polysilicon gate electrode, for example.

As a preferred embodiment, the composite device may also integrate therein an isolator 610 to isolate the power transistor from the depletion transistor. The isolator 610 may be located between the cell portion 608 of the power transistor and the cell portion 608' of the depletion transistor.

Still taking an N-type device as an example, the isolator 610 may include:

a P-type doped floating well region 615, which is formed in parallel with the power transistor well region 602 and the depletion transistor well region 602' on the front side of the epitaxial region 606, wherein the floating well region 615 is located between the power transistor well region 602 and the depletion transistor well region 602';

a first gate 614 formed on the front side of the epitaxial region 606, wherein the first gate 614 covers at least a portion of the floating well region 615 and at least a portion of the power transistor well region 602, the first gate 614 further covers the epitaxial region 606 between the floating well region 615 and the power transistor well region 602; and a second gate 616 formed on the front side of the epitaxial region 606, wherein the second gate 616 covers at least a portion of the floating well region 615 and at least a portion of the depletion transistor well region 602', the second gate 616 further covers the epitaxial region 606 between the floating well region 615 and the depletion transistor well region 602'.

The first gate 614 and the power transistor well region 602 are shorted, e.g., shorted via the second electrode 603, but are not so limited; the second gate 616 and the depletion transistor well region 602' are shorted, e.g., shorted via the third electrode 603', but are not so limited.

The floating well region 615 may be formed by the same implantation process as the power transistor well region 602 and the depletion transistor well region 602'. The first gate 614 and the second gate 616 may each include a gate dielectric layer and a gate electrode on the gate dielectric layer. The gate electrode may be a polysilicon gate electrode, for example.

When the composite device operates, it requires that the gate 604 of the power transistor is independent from the gate of the depletion transistor, the isolation withstand voltage thereof is determined by the withstand voltage of the gate dielectric layer, and may be more than 40V; and that the source of the power transistor is independent from the source of the depletion transistor. Due to the presence of the floating well region 615, the isolation withstand voltage between the P-type well region 602 of the power transistor and the adjacent P-type well region 602' of the depletion transistor is increased greatly, up to more than 40V. The isolation withstand voltage can fully meet the requirements of a switching power supply control system.

When the composite device is turned off, the depletion layers of the power transistor well region 602, the depletion transistor well region 602' and the floating well region 615 in the isolator 610 are connected to each other. The inter-connection of the depletion layers has the same effect as the inter-connection of the depletion layers of the P-type well regions when the power transistor or the depletion transistor is turned off, and may endure a high withstand voltage.

Referring to FIG. 8, it shows a layout 701 of the first instance of the composite device as shown in FIG. 9. FIG. 9 is a cross-sectional view along a direction BB' of FIG. 8. On a front side of the layout 701, there are bonding pads for the source S and the drain G of the power transistor as well as bonding pads for the source S' and the gate G' of the depletion transistor. On a back side of the layout 701, there are the drains of the power transistor and the depletion transistor.

FIG. 8 shows a region 708', which is an active region or cell portion of the depletion-mode MOS device. The first enhancement-mode MOS device and the depletion-mode MOS device are located within a high-voltage ring 707, which may have a structure similar to the high-voltage ring of the enhancement-mode MOS device shown in FIG. 4 or the depletion-mode MOS device shown in FIG. 6.

Normally, the depletion-mode MOS device has a small current, and thus the active region 708' of the depletion-mode MOS device may have a relatively small area. However, the scope of this application is not limited in the area of the active region of the depletion-mode MOS device and the area of the active region of the enhancement-mode MOS device. According to the practical requirements, if a larger current is required for the depletion-mode MOS device, the area of the active region 708' may be increased in order to meet the practical requirements.

As above, with the composite device of the first embodiment, two independent enhancement-mode MOS device and depletion-mode MOS device may be integrated together in the same composite device. Since a high-voltage ring in a high-voltage device needs a large area, and the two devices in this embodiment may share a common high-voltage ring, the high-voltage ring for at least one device is omitted, thereby reducing the chip area and improving the chip integrity.

Moreover, a process flow for the composite device is substantially the same as an enhancement-mode MOS device with the addition of an inversed channel region, and the process flow for the composite device is completely the same as the depletion-mode MOS, thus the chip process complexity and cost are reduced.

Figure 10:
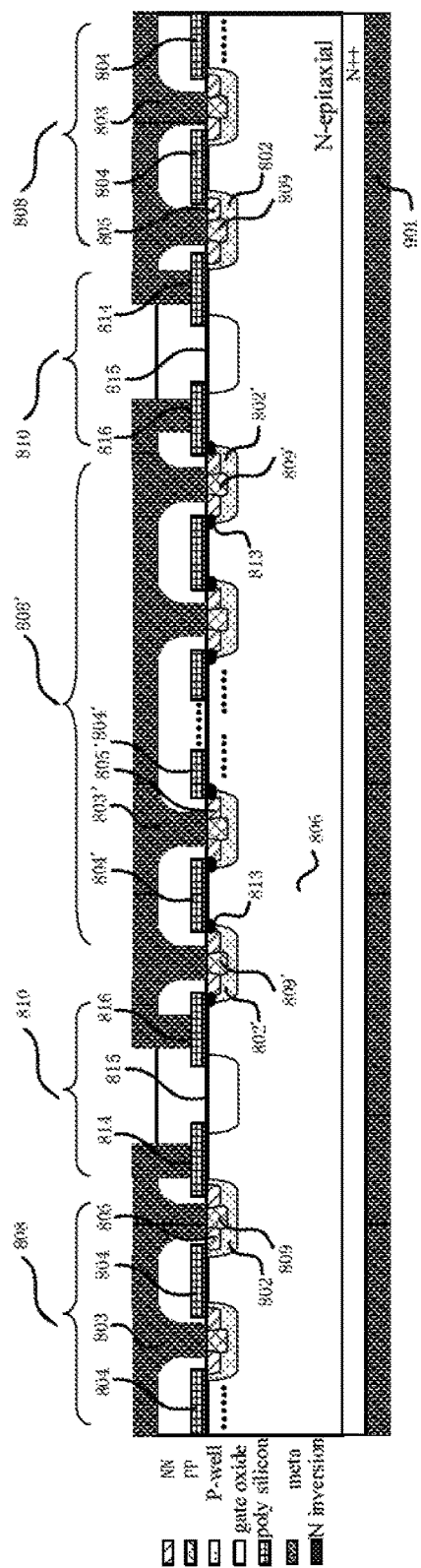
FIG. 10 is a cross-sectional view of a second instance of the composite device in the flyback switching power supply according to the first embodiment of present invention.

Referring to FIG. 10, it shows a cross-sectional view of a second instance of the composite device in the first embodiment, wherein a power transistor and a depletion transistor are integrated in the same composite device. The composite device includes a cell portion 808 of the power transistor and a cell portion 808' of the depletion transistor, wherein both cell portions are active regions. In case where both the power transistor and the depletion transistor are N-type devices, for example, the composite device may include:

an N-type doped epitaxial region 806 having a first electrode 801 on a back side thereof, wherein the epitaxial region 806 is shorted to the first electrode 801 to form the drains of the power transistor and the depletion transistor;

a power transistor well region 802 and a depletion transistor well region 802' of P-type doping, formed on a front side of the epitaxial region 806;

an N-type doped power transistor doped region 805 formed in the power transistor well region 802;

an N-type doped depletion transistor doped region 805' formed in the depletion transistor well region 802';

an N-type doped channel region 813 within the depletion transistor well region 802', wherein the channel region 813 extends from a boundary of the depletion transistor well region 802' to a boundary of the depletion transistor doped region 805';

a gate 804 of the power transistor formed on the front side of the epitaxial region 806, wherein the gate 804 of the power transistor covers at least a portion of the power transistor doped region 805 and extends onto the epitaxial region 806 outside the power transistor well region 802;

a gate 804' of the depletion transistor formed on the front side of the epitaxial region 806, wherein the gate 804' of the depletion transistor covers the channel region 813 and extends onto the epitaxial region 806 outside the depletion transistor well region 802';

a first P-type doped leading-out region 809, which is formed in parallel with the power transistor doped region 805 within the power transistor well region 802; and a second P-type doped leading-out region 809', which is formed in parallel with the depletion transistor doped region 805' within the depletion transistor well region 802'.

Thereof, the power transistor well region 802, the first leading-out region 809 and the power transistor doped region 805 may be shorted via a second electrode 803, to form the source of the power transistor. The depletion transistor well region 802', the second leading-out region 809' and the depletion transistor doped region 805' are shorted via a third electrode 803', to form the source of the depletion transistor.

As a non-limiting instance, the gate 804 of the power transistor and the gate 804' of the depletion transistor may each include a gate dielectric layer and a gate electrode on the gate dielectric layer. The gate electrode may be a polysilicon gate electrode, for example.

As a preferred embodiment, the composite device may also integrate therein an isolator 810 to isolate the power transistor from the depletion transistor. The isolator 810 may be located between the cell portion 808 of the power transistor and the cell portion 808' of the depletion transistor.

Still taking an N-type device as an example, the isolator 810 may include:

a P-type doped floating well region 815, which is formed in parallel with the power transistor well region 802 and the depletion transistor well region 802' on the front side of the epitaxial region 806, wherein the floating well region 815 is located between the power transistor well region 802 and the depletion transistor well region 802';

a first gate 814 formed on the front side of the epitaxial region 806, wherein the first gate 814 covers at least a portion of the floating well region 815 and at least a portion of the power transistor well region 802, the first gate 814 further covers the epitaxial region 806 between the floating well region 815 and the power transistor well region 802; and a second gate 816 formed on the front side of the epitaxial region 806, wherein the second gate 816 covers at least a portion of the floating well region 815 and at least a portion of the depletion transistor well region 802', the second gate 816 further covers the epitaxial region 806 between the floating well region 815 and the depletion transistor well region 802'.

The first gate 814 and the power transistor well region 802 are shorted, e.g., shorted via the second electrode 803, but are not so limited; the second gate 816 and the second well region 802' are shorted, e.g., shorted via the third electrode 803', but are not so limited.

The structure in FIG. 10 is mainly different from FIG. 8 and FIG. 9 in that, the floating well region 815 may be formed by an implantation process different from that for the power transistor well region 802 and the depletion transistor well region 802'. That is, different implantation processes may be employed in multiple steps to form the floating well region 815 separately from the power transistor well region 802 and the depletion transistor well region 802'. For example, the floating well region 815 may be formed by an injection process for forming a voltage division ring or a dopant injection process of other concentrations.

Figure 11:
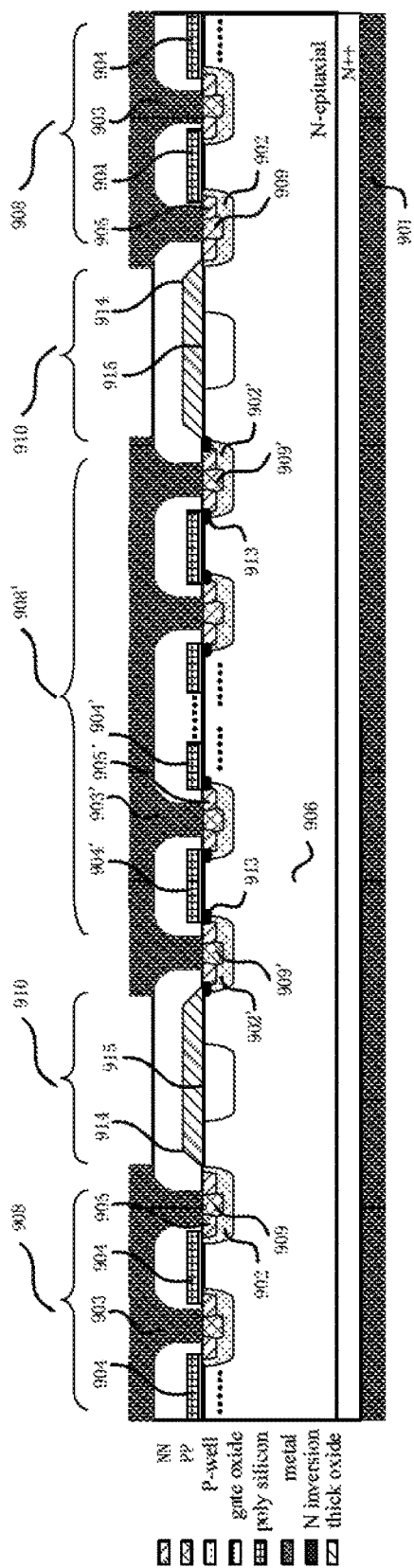
FIG. 11 is a cross-sectional view of a third instance of the composite device in the flyback switching power supply according to the first embodiment of present invention.

Referring to FIG. 11, it shows a cross-sectional view of a third instance of the composite device in the first embodiment, wherein a power transistor and a depletion transistor are integrated in one same composite device.

The composite device includes a cell portion 908 of the power transistor and a cell portion 908' of the depletion transistor, wherein both cell portions are active regions. Similar to the structure shown in FIG. 10, the composite device shown in FIG. 11 also includes an epitaxial region 906, a first electrode 901, a power transistor well region 902, a power transistor doped region 905, a first leading-out region 909, a depletion transistor well region 902', a depletion transistor doped region 905', a second leading-out region 909', a gate 904 of the power transistor, a gate 904' of the depletion transistor, a second electrode 903, a third electrode 903' and an isolator 910.

As compared with the structure shown in FIG. 10, the main difference of the composite device shown in FIG. 11 is the specific structure of the isolator 910. In particular, the isolator 910 includes: a P-type doped floating well region 915, which is formed in parallel with the power transistor well region 902 and the depletion transistor well region 902' on the front side of the epitaxial region 906, wherein the floating well region 915 is located between the power transistor well region 902 and the depletion transistor well region 902'; and a dielectric layer 914 formed on the front side of the epitaxial region 906, wherein the dielectric layer 914 covers the floating well region 915 and extends onto the epitaxial region 906 outside the floating well region 915. The dielectric layer 914 may be a relatively thick oxide layer, for example.

The floating well region 915 may be formed with the same or different implantation process as the power transistor well region 902 and the depletion transistor well region 902'. For example, the floating well region 915 may be formed by a dopant implantation process for forming a voltage division ring or a dopant implantation process of other concentrations.

Figure 12:
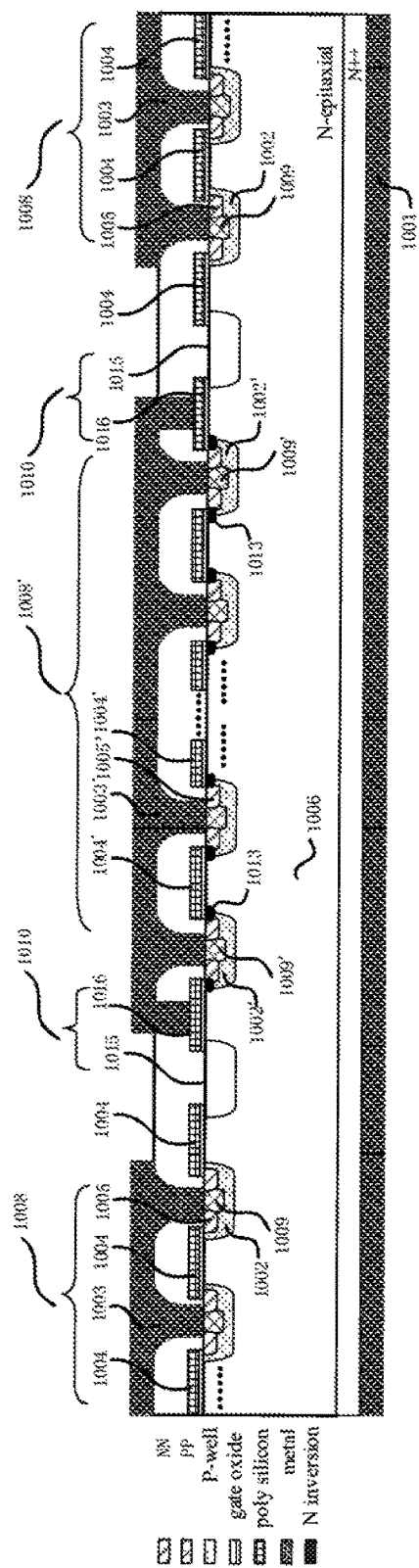
FIG. 12 is a cross-sectional view of a fourth instance of the composite device in the flyback switching power supply according to the first embodiment of present invention.

Referring to FIG. 12, it shows a cross-sectional view of a fourth instance of the composite device in the first embodiment, wherein a power transistor and a depletion transistor are integrated in one same composite device.

The composite device includes a cell portion 1008 of the power transistor and a cell portion 1008' of the depletion transistor, wherein both cell portions are active regions. Similar to the structure shown in FIG. 10, the composite device also includes an epitaxial region 1006, a first electrode 1001, a power transistor well region 1002, a power transistor doped region 1005, a first leading-out region 1009, a depletion transistor well region 1002', a depletion transistor doped region 1005', a second leading-out region 1009', a gate 1004 of the power transistor, a gate 1004' of the depletion transistor, a second electrode 1003, a third electrode 1003' and an isolator 1010.

As compared with the structure shown in FIG. 10, the main difference of the composite device shown in FIG. 12 is the internal structure of the isolator 1010. The isolator 1010 includes:

a P-type doped floating well region 1015, which is formed in parallel with the power transistor well region 1002 and the depletion transistor well region 1002' on the front side of the epitaxial region 1006, wherein the floating well region 1015 is located between the power transistor well region 1002 and the depletion transistor well region 1002';

a second gate 1016 formed on the front side of the epitaxial region 1006, wherein the second gate 1016 covers at least a portion of the floating well region 1015 and at least a portion of the depletion transistor well region 1002', the second gate 1016 further covers the epitaxial region 1006 between the floating well region 1015 and the depletion transistor well region 1002'. The second gate 1016 and the depletion transistor well region 1002' are shorted, for example, shorted via the third electrode 1003'.

The floating well region 1015 may be formed with the same or different implantation process as the power transistor well region 1002 and the depletion transistor well region 1002'. For example, the floating well region 1015 may be formed by a dopant implantation process for forming a voltage division ring or a dopant implantation process of other concentrations.

Figure 13:
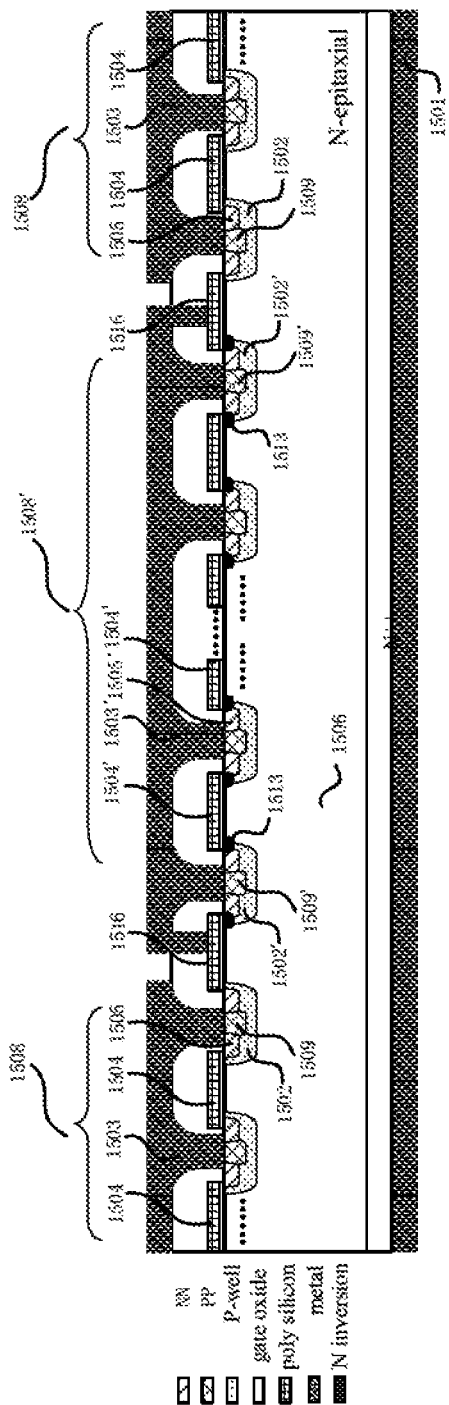
FIG. 13 is a cross-sectional view of a fifth instance of the composite device in the flyback switching power supply according to the first embodiment of present invention.

Referring to FIG. 13, it shows a cross-sectional view of a fifth instance of the composite device in the first embodiment, wherein a power transistor and a depletion transistor are integrated in the same composite device.

As the application and development of products, it may subsequently tend to have lower and lower system operating voltages. When the requirements on the isolation withstand voltage are relaxed, e.g., below 10V, the structure of the composite device above may be further simplified.

The fifth instance shown in FIG. 13 is applicable in a switching power supplying with a decreased system operating voltage. The composite device includes a cell portion 1508 of the power transistor and a cell portion 1508' of the depletion transistor, wherein both cell portions are active regions. The structure of this composite device is substantially the same as the first instance shown in FIG. 8, including an epitaxial region 1506, a first electrode 1501, a first well region 1502, a first doped region 1505, a first leading-out region 1509, a second well region 1502', a second doped region 1505', a second leading-out region 1509', a gate 1504 of a first enhancement-mode MOS device, a gate 1504' of a depletion-mode MOS device, a second electrode 1503, and a third electrode 1503'.

The fifth instance is mainly different from the first instance in the specific structure of the isolator. The isolator according to the fifth instance does not include the floating well region and the first gate, while retaining only the second gate 1516 formed on the front side of the epitaxial region 1506. The second gate 1516 covers at least a portion of the first well region 1502 and at least a portion of the second well region 1502', and the second gate 1516 further covers the epitaxial region 1506 between the first well region 1502 and the second well region 1502'. The second gate 1516 and the second well region 1502' are shorted, e.g., shorted via the third electrode 1503', but are not so limited.

As compared with the first instance, the composite device in the fifth instance may further simplify the isolator, to save the area of the composite device and reduce the cost.

The instance shown in FIG. 13 results from variation based on the first instance of the composite device, wherein the floating well region and the first gate are omitted in the isolator. It should be noted that, the isolator may also be applied to other instances of the composite device above, as desired.

In addition, as another variation of the isolator, based on the first instance of the composite device, the floating well region and the second gate may be omitted in the isolator, while only the first gate is retained. More particularly, the isolator may include: the first gate formed on the front side of the epitaxial region, wherein the first gate covers at least a portion of the power transistor well region and at least a portion of the depletion transistor well region, the first gate further covers the epitaxial region between the power transistor well region and the depletion transistor well region. The first gate and the power transistor well region are shorted, e.g., shorted via the second electrode, but are not so limited.

Similar to the isolator in the fifth instance shown in FIG. 13, the isolator variation above may also be applied to other instances of the composite device above.

It should be noted that, the above variations of the isolator in FIGS. 10, 11, 12, and 13 may be combined, and the combination falls within the scope of this application.

Figure 14:
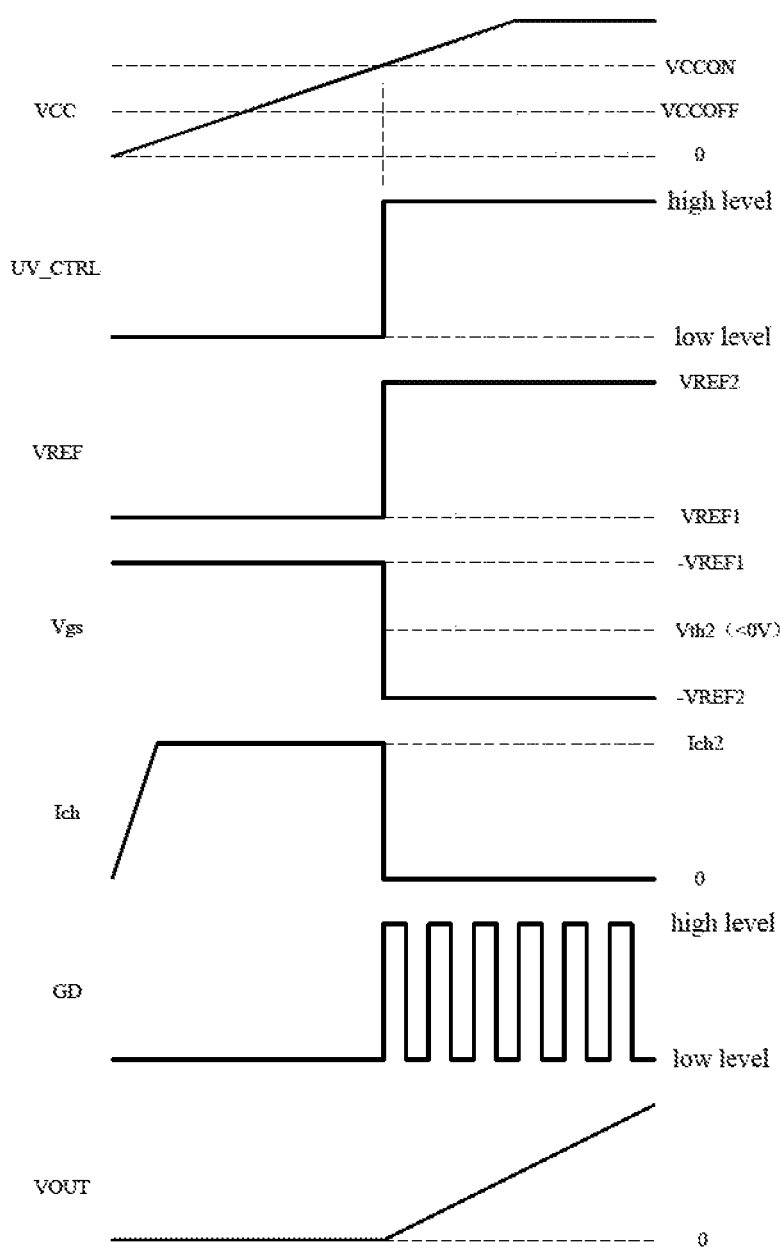
FIG. 14 is a signal waveform schematic diagram during startup of the flyback switching power supply according to the first embodiment of present invention.

Referring to FIG. 14, it shows a signal waveform diagram during the high-voltage startup of the flyback switching power supply 500 shown in FIG. 7, including waveforms at the power supply terminal VCC of the switching power supply control device 502, the output UV_CTRL and the output VREF of the ON/OFF controller 505, the voltage difference Vgs between the high-voltage startup gate HS_G and the high-voltage startup source HS_S of the high-voltage startup controller 508, the high-voltage startup charging current Ich of the startup capacitor C1, the gate driving terminal GD of the switching power supply control device 502, and the output voltage VOUT.

In connection with FIG. 7 and FIG. 14, the operational principle for the high-voltage startup of the flyback switching power supply 500 according to the first embodiment of present invention is outlined as follow:

When the switching power supply 500 initiates the high-voltage startup, the startup capacitor C1 is not charged, thus the voltage at the power supply terminal VCC of the switching power supply control device 502 is typically at 0V and lower than the turn-off voltage VCCOFF of the ON/OFF controller 505, then the output UV_CTRL of the ON/OFF controller 505 is invalid (e.g., UV_CTRL is low), and the output VREF is VREF1 (e.g., VREF1=0). On one hand, the PWM controller 506 is turned off and does not operate, for example, the voltage at the gate driving terminal GD is always low, and the power transistor 504 in the composite device 501 is always OFF, such that the drain E_D of the power transistor 504 does not provide the power output current, and the input signal VIN cannot deliver energy to the output VOUT of the switching power supply 500 via the primary winding L1 and the secondary winding L2 of the transformer, the output rectifier diode D1 and the filter capacitor C2. That is, the output voltage VOUT is 0. On the other hand, the high-voltage startup controller 508 controls the voltage difference Vgs between the high-voltage startup gate HS_G and the high-voltage startup source HS_S to be −VREF1 (e.g., VREF1=0), which is higher than the threshold voltage Vth2 (e.g., Vth2<0V) of the depletion transistor 507 in the composite device 501, then the depletion transistor S2 is turned on, and the input signal VIN supplies the high-voltage startup charging current Ich to the power supply terminal VCC via the primary winding L1 of the transformer, the depletion transistor 507 and the high-voltage startup controller 508, for example, Ich increases from 0 to Ich2 (e.g., Ich2>0) to charge the startup capacitor C1, and the voltage at the power supply terminal VCC starts to rise. As such, the switching power supply 500 begins the high-voltage startup procedure.

When the voltage at the power supply terminal VCC rises above the turn-on voltage VCCON of the ON/OFF controller 505, the voltage at the output UV_CTRL of the ON/OFF controller 505 transitions from invalid to valid (e.g., transitions from low to high), and the voltage at the output VREF changes from VREF1 (e.g., VREF1=0) to VREF2 (e.g., VREF2>0). On one hand, the PWM controller 506 starts to operate, and the gate driving terminal GD of the switching power supply control device 502 outputs a driving signal, e.g., a PWM modulated signal, which controls the ON/OFF of the power transistor 504 in the composite device 501, such that the input signal VIN delivers energy to the output of the switching power supply 500 via the primary winding L1 and the secondary winding L2 of the transformer, the output rectifier diode D1 and the filter capacitor C2, and thus the output voltage VOUT starts to rise. On the other hand, the high-voltage startup controller 508 controls the voltage difference Vgs between the high-voltage startup gate HS_G and the high-voltage startup source HS_S to be −VREF2 (e.g., VREF2>0), which is lower than the threshold voltage Vth2 (e.g., Vth2<0V) of the depletion transistor 507 in the composite device 501, such that the depletion transistor 507 is turned off, and the input signal VIN stops supplying the high-voltage startup charging current Ich to the power supply terminal VCC via the primary winding L1, the depletion transistor 507 and the high-voltage startup controller 508, for example, Ich transitions from Ich2 (e.g., Ich2>0) to 0, and stops charging the startup capacitor C1. Instead, the power supply terminal VCC is powered by the input signal VIN via the primary winding L1 and the auxiliary winding L3 of the transformer, the auxiliary winding diode D2 and the startup capacitor C1. As such, the switching power supply 500 completes the high-voltage startup procedure and starts to operate.

Figure 15:
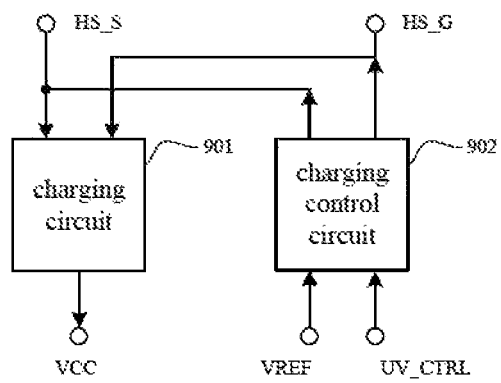
FIG. 15 is a structural block diagram of a high-voltage startup controller in the flyback switching power supply according to the first embodiment of present invention.

Referring to FIG. 15, it shows a structural block diagram of the high-voltage startup controller 508 in FIG. 7, including a charging circuit 901 and a charging control circuit 902.

In connection with FIG. 7 and FIG. 15, the charging circuit 901 has inputs coupled to the high-voltage startup source HS_S and the high-voltage startup gate HS_G of the switching power supply control device 502, and the charging circuit 901 has an output coupled to the power supply terminal VCC of the switching power supply control device 502. The charging control circuit 902 has inputs coupled to the output UV_CTRL and the output VREF of the ON/OFF controller 505 in the switching power supply control device 502, and the charging control circuit 902 has outputs coupled to the high-voltage startup source HS_S and the high-voltage startup gate HS_G of the switching power supply control device 502.

In connection with FIG. 7 and FIG. 15, the operational principle of the high-voltage startup controller is outlined as follow: when the output UV_CTRL of the ON/OFF controller 505 is invalid (e.g., UV_CTRL is low) and the output VREF is VREF1 (e.g., VREF1 is 0V), the charging control circuit 902 controls the voltage difference Vgs between the high-voltage startup gate HS_G and the high-voltage startup source HS_S to be −VREF1, which is higher than the threshold voltage Vth2 (e.g., Vth2<0V) of the depletion transistor 507 in the composite device 501, then the depletion transistor 507 is turned on, and the high-voltage startup source HS_S supplies the high-voltage startup charging current Ich to the power supply terminal VCC via the charging circuit 901, for example, Ich increases from 0 to Ich2 (e.g., Ich2>0).

When the output UV_CTRL of the ON/OFF controller 505 is valid (e.g., UV_CTRL is high) and the voltage of the output VREF is VREF2 (e.g., VREF2>0), the charging control circuit 902 controls the voltage difference Vgs between the high-voltage startup gate HS_G and the high-voltage startup source HS_S to be −VREF2, which is lower than the threshold voltage Vth2 (e.g., Vth2<0V) of the depletion transistor 507, then the depletion transistor 507 is turned off, and the high-voltage startup source HS_S stops supplying the high-voltage startup charging current Ich to the power supply terminal VCC via the charging circuit 901, for example, Ich transitions from Ich2 (e.g., Ich2>0) to 0.

Figure 16:
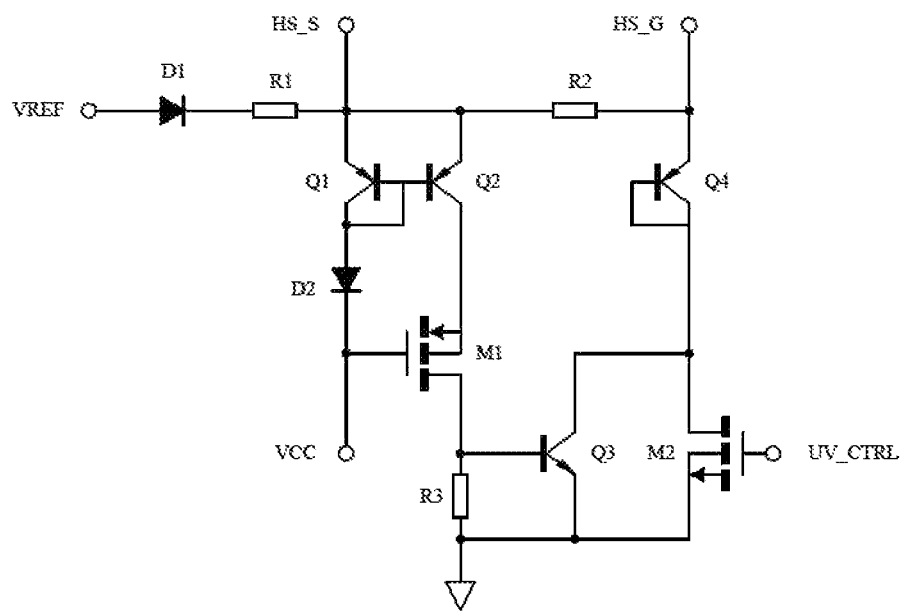
FIG. 16 is a specific circuit schematic diagram of the high-voltage startup controller in the flyback switching power supply according to the first embodiment of present invention.

Referring to FIG. 16, it shows a specific instance for the high-voltage startup controller shown in FIG. 15. The charging control circuit in the high-voltage startup controller includes a diode D1, a resistor R1, a resistor R2, a PNP triode Q4, and a NMOS field effect transistor M2. The charging circuit in the high-voltage startup controller includes a PNP triode Q1, a PNP triode Q2, a diode D2, a PMOS field effect transistor M1, a resistor R3, a NPN triode Q3, a PNP triode Q4 and a resistor R2.

In connection with FIG. 7 and FIG. 16, the anode of the diode D1 is coupled to the output VREF of the ON/OFF controller 505, the cathode of the diode D1 is coupled to one end of the resistor R1; the other end of the resistor R1 is coupled to the high-voltage startup source HS_S of the switching power supply control device 502, the emitter of the PNP triode Q1, the emitter of the PNP triode Q2 and one end of the resistor R2; the other end of the resistor R2 is coupled to the high-voltage startup gate HS_G of the switching power supply control device 502 and the emitter of the PNP triode Q4; the base of the PNP triode Q1 is coupled to the collector of the PNP triode Q1, the base of the PNP triode Q2 and the anode of the diode D2; the cathode of the diode D2 is coupled to the gate of the PMOS field effect transistor M1 and the power supply terminal VCC of the switching power supply control device 502; the collector of the PNP triode Q2 is coupled to the source of the PMOS field effect transistor M1; the drain of the PMOS field effect transistor M1 is coupled to the base of the NPN triode Q3 and one end of the resistor R3; the other end of the resistor R3 is coupled to ground; the emitter of the NPN triode Q3 is coupled to ground, the collector of the NPN triode Q3 is coupled to the drain of the NMOS field effect transistor M2 as well as the collector and the base of the PNP triode Q4; the gate of the NMOS field effect transistor M2 is coupled to the output UV_CTRL of the ON/OFF controller 505, and the source of the NMOS field effect transistor M2 is coupled to ground.

In connection with FIG. 7 and FIG. 16, the operational principle of the high-voltage startup controller shown in FIG. 16 is outlined as follow: when the output UV_CTRL of the ON/OFF controller 505 is invalid (e.g., UV_CTRL is low) and the voltage at the output VREF is VREF1 (e.g., VREF1=0), the NMOS field effect transistor M2 is turned off, the high-voltage startup gate HS_G and the high-voltage startup source HS_S are shorted via the resistor R2, the voltage difference Vgs therebetween is 0 and higher than the threshold voltage Vth2 (e.g., Vth2<0V) of the depletion transistor 507 in the composite device 501, such that the depletion transistor 507 is turned on, and the high-voltage startup source HS_S supplies the high-voltage startup charging current Ich to the power supply terminal VCC via the PNP triode Q1 and the diode D2, e.g., Ich increases from 0; meanwhile, the high-voltage startup charging current Ich is sampled by the current mirror comprised of the PNP triode Q1 and the PNP triode Q2, wherein the sampled current passes through the PMOS field effect transistor M1 and generates a voltage drop across the resistor R3, which voltage drop determines a collector current of the NPN triode Q3, which flows through the PNP triode Q4 and generates a voltage drop across the resistor R2, which voltage drop determines the voltage difference Vgs between the high-voltage startup gate HS_G and the high-voltage startup source HS_S, wherein the voltage difference determines that the charging current Ich is Ich2 (e.g., Ich2>0).

When the output UV_CTRL of the ON/OFF controller 505 is valid (e.g., UV_CTRL is high) and the voltage at the output VREF is VREF2 (e.g., VREF2>0), the NMOS field effect transistor M2 is turned on, the voltage VREF2 at the output VREF of the ON/OFF controller 505, after minus the forward voltage of the PN junction in the diode D1, the voltage difference between the emitter and the base of the PNP triode Q4, and the drain-source voltage difference of the NMOS field effect transistor M2, is divided by the resistor R1 and the resistor R2, such that the voltage drop across the resistor R2 (i.e., the voltage difference Vgs between the high-voltage startup gate HS_G and the high-voltage startup source HS_S) is lower than the threshold voltage Vth2 (e.g., Vth2<0V) of the depletion transistor 507, so the depletion transistor 507 is turned off, and the high-voltage startup source HS_S stops supplying the high-voltage startup charging current Ich to the power supply terminal VCC via the PNP triode Q1 and the diode D2, e.g., Ich transitions from Ich2 (e.g., Ich2>0) to 0. At this point, the voltage at the power supply terminal VCC reaches the turn-on voltage VCCON of the ON/OFF controller 505, then the voltage at the power supply terminal VCC is higher than the voltage at the high-voltage startup source HS_S, but the voltage difference therebetween is lower than the reverse withstand voltage of the PN junction in the diode D2, so the current at the power supply terminal VCC will not flow back into the high-voltage startup source HS_S.

Figure 17:
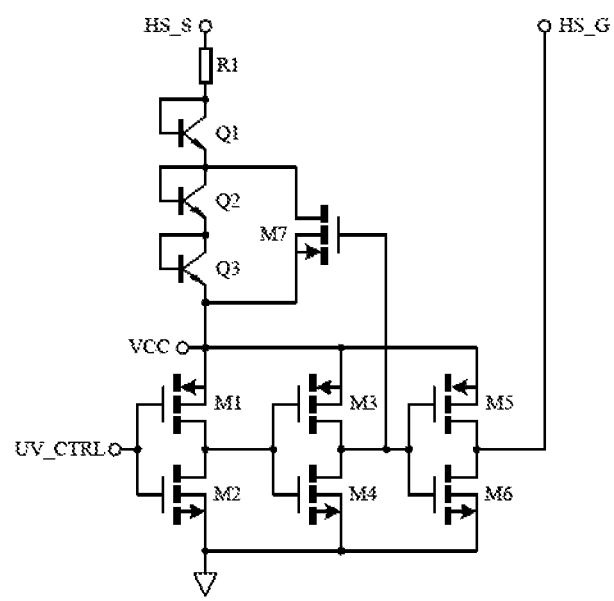
FIG. 17 is another specific circuit schematic diagram of the high-voltage startup controller in the flyback switching power supply according to the first embodiment of present invention.

Referring to FIG. 17, it shows another specific instance of the high-voltage startup controller 508 shown in FIG. 7, including a resistor R1, a NPN triode Q1, a NPN triode Q2, a NPN triode Q3, a PMOS field effect transistor M7, a PMOS field effect transistor M1, a NMOS field effect transistor M2, a PMOS field effect transistor M3, a NMOS field effect transistor M4, a PMOS field effect transistor M5, and a NMOS field effect transistor M6.

One end of the resistor R1 is coupled to the high-voltage startup source HS_S of the switching power supply control device 502; the other end of the resistor R1 is coupled to the collector and the base of the NPN triode Q1; the emitter of the NPN triode Q1 is coupled to the collector and the base of the NPN triode Q2 and to the drain of the PMOS field effect transistor M7; the emitter of the NPN triode Q2 is coupled to the collector and the base of the NPN triode Q3; the emitter of the NPN triode Q3 is coupled to the source of the PMOS field effect transistor M7 and the power supply terminal VCC of the switching power supply control device 502; the source of the PMOS field effect transistor M1 is coupled to the power supply terminal VCC of the switching power supply control device 502; the gate of the PMOS field effect transistor M1 is coupled to the output UV_CTRL of the ON/OFF controller 505 and the gate of the NMOS field effect transistor M2; the drain of the PMOS field effect transistor M1 is coupled to the drain of the NMOS field effect transistor M2, the gate of the PMOS field effect transistor M3 and the gate of the NMOS field effect transistor M4; the source of the NMOS field effect transistor M2 is coupled to ground; the source of the PMOS field effect transistor M3 is coupled to the power supply terminal VCC of the switching power supply control device 502; the drain of the PMOS field effect transistor M3 is coupled to the drain of the NMOS field effect transistor M4, the gate of the PMOS field effect transistor M7, the gate of the PMOS field effect transistor M5 and the gate of the NMOS field effect transistor M6; the source of the NMOS field effect transistor M4 is coupled to ground; the source of the PMOS field effect transistor M5 is coupled to the power supply terminal VCC of the switching power supply control device 502; the drain of the PMOS field effect transistor M5 is coupled to the drain of the NMOS field effect transistor M6 and the high-voltage startup gate HS_G of the switching power supply control device 502; and the source of the NMOS field effect transistor M6 is coupled to ground.

Referring to FIG. 7 and FIG. 17, the operational principle of the high-voltage startup controller shown in FIG. 17 is as follow. When the output UV_CTRL of the ON/OFF controller 505 is invalid (e.g., UV_CTRL is low), the drain of the PMOS field effect transistor M3 is also invalid (e.g., the drain of M3 is low), then the PMOS field effect transistors M5 and M7 are both turned on, and the voltage at the high-voltage startup gate HS_G is the voltage at the power supply terminal VCC, the voltage at the high-voltage startup source HS_S is (the voltage at the power supply terminal VCC+the voltage difference between the base and the emitter of the NPN triode Q1+the voltage drop on the resistor R1), that is, the voltage difference Vgs between the high-voltage startup gate HS_G and the high-voltage startup source HS_S is—(the voltage difference between the base and the emitter of the NPN triode Q1+the voltage drop across the resistor R1), which is higher than the threshold voltage Vth2 (e.g., Vth2<0) of the depletion transistor 507 in the composite device 501, such that the depletion transistor 507 is turned on, and the high-voltage startup source HS_S supplies the high-voltage startup charging current Ich to the power supply terminal VCC via the resistor R1, the NPN triode Q1 and the PMOS field effect transistor M7, e.g., Ich increases from 0. Ich is determined by the voltage difference—(the voltage difference between the base and the emitter of the NPN triode Q1+the voltage drop across the resistor R1), and finally increases to Ich2 (e.g., Ich2>0).

When the output UV_CTRL of the ON/OFF controller 505 is valid (e.g., UV_CTRL is high), the drain of the PMOS field effect transistor M3 is also valid (e.g., the drain of M3 is high), then the PMOS field effect transistors M5 and M7 both are turned off, and the NMOS field effect transistor M6 is turned on, so the voltage at the high-voltage startup gate HS_G is 0, the voltage at the high-voltage startup source HS_S is (the power supply VCC+the voltage difference between the base and the emitter of the NPN triode Q3+the voltage difference between the base and the emitter of the NPN triode Q2+the voltage difference between the base and the emitter of the NPN triode Q1+the voltage drop across the resistor R1), that is, the voltage difference Vgs between the high-voltage startup gate HS_G and the high-voltage startup source HS_S is—(the voltage difference between the base and the emitter of the NPN triode Q3+the voltage difference between the base and the emitter of the NPN triode Q2+the voltage difference between the base and the emitter of the NPN triode Q1+the voltage drop across the resistor R1), which is lower than the threshold voltage Vth2 (e.g., Vth2<0) of the depletion transistor 507, such that the depletion transistor 507 is turned off, and the high-voltage startup source HS_S stops supplying the high-voltage startup charging current Ich to the power supply terminal VCC via the resistor R1, the NPN triode Q1 and the PMOS field effect transistor M7, for example, Ich transitions from Ich2 (e.g., Ich2>0) to 0. At this point, the voltage at the power supply terminal VCC reaches the turn-on voltage VCCON of the ON/OFF controller 505, then the voltage at the power supply terminal VCC is higher than the voltage at the high-voltage startup source HS_S, but the voltage difference therebetween is lower than the sum of the reverse withstand voltages of the base-emitter junction (i.e., BE junction) of the NPN triode Q3, the NPN triode Q2, and the NPN triode Q1, so the current at the power supply terminal VCC will not flow back into the high-voltage startup source HS_S.

It should be noted that, the flyback main circuit in the first embodiment is merely an example, and those skilled in the art should understand that, the main circuit may be other proper flyback circuit.

Moreover, the values and validity of the control voltage, the internal operating voltage, the turn-on voltage, the turn-off voltage, and the startup current involved in the first embodiment are merely examples. Those skilled in the art should understand that, these parameters may be otherwise chosen appropriately depending on the practical demands. For example, the control voltage may be valid at a low level and invalid at a high level, and so on.

Second Embodiment

Figure 18:
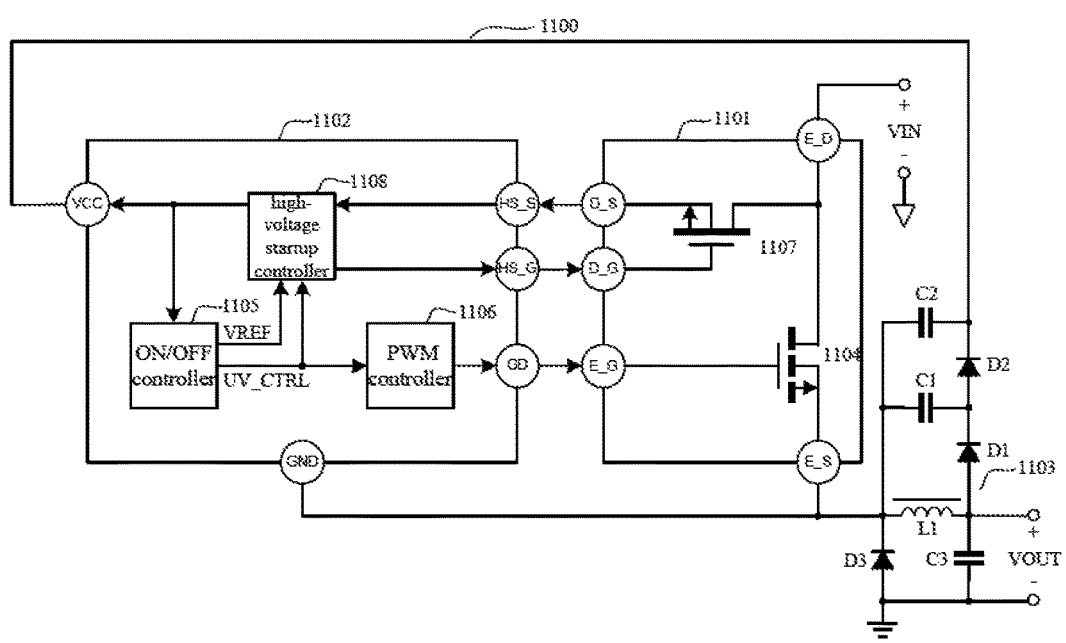
FIG. 18 is a circuit schematic diagram of a boost switching power supply according to a second embodiment of present invention.

Referring to FIG. 18, it shows a circuit diagram of a switching power supply 1100 according to a second embodiment. The switching power supply 1100 includes a switching power supply controller and a main circuit coupled thereto, wherein the switching power supply controller includes a switching power supply control device 1102 and a composite device 1101. The main circuit may have a boost structure.

The switching power supply control device 1102 includes an ON/OFF controller 1105, a PWM controller 1106 and a high-voltage startup controller 1108. The composite device 1101 includes a power transistor 1104 and a depletion transistor 1107. The structures and operational principles of the switching power supply control device 1102 and the composite device 1101 are similar to the switching power supply control device 502 and the composite device 501 according to the first embodiment shown in FIG. 7, and will not be repeated here.

The main circuit in the second embodiment includes an inductor L1, a diode D1, a diode D2, a capacitor C1, a capacitor C2, a diode D3 and a capacitor C3. The inductor L1 has a first terminal coupled to an output of the switching power supply, and has a second terminal coupled to a ground terminal of the switching power supply control device 1102 and to a first output of the composite device 1101; the diode D1 has an anode coupled to the first terminal of the inductor L1; the diode D2 has an anode coupled to a cathode of the diode D1, and has a cathode coupled to a power supply terminal VCC; the capacitor C1 has a first terminal coupled to the cathode of the diode D1, and has a second terminal coupled to the second terminal of the inductor L1; the capacitor C2 has a first terminal coupled to the power supply terminal VCC, and has a second terminal coupled to the second terminal of the inductor L1; the diode D3 has a cathode coupled to the second terminal of the inductor L1, and has an anode coupled to ground; the capacitor C3 has a first terminal coupled to the output of the switching power supply, and has a second terminal coupled to ground. In addition, the composite device 1101 has an input signal terminal E_D to receive an input signal VIN of the switching power supply 1100.

Similar to the first embodiment, the operational principle for the high-voltage startup of the boost switching power supply 1100 is outlined as follow:

When the switching power supply 1100 initiates the high-voltage startup, the voltage at the power supply terminal VCC of the switching power supply control device 1102 is 0 and lower than the turn-off voltage VCCOFF of the ON/OFF controller 1105, then the high-voltage startup controller 1108 controls to turn on the depletion transistor 1107 in the composite device 1101, and the AC input voltage VIN supplies the high-voltage startup charging current to the power supply terminal VCC via the depletion transistor 1107 and the high-voltage startup controller 1108, such that the voltage at the power supply terminal VCC rises; when the voltage at the power supply terminal VCC rises above the turn-on voltage VCCON of the ON/OFF controller 1105, the high-voltage startup controller 1108 controls to turn off the depletion transistor 1107 in the composite device 1101, and the AC input voltage VIN stops supplying the high-voltage startup charging current to the power supply terminal VCC via the depletion transistor 1107 and the high-voltage startup controller 1108, and the power supply terminal VCC is instead powered by the DC output voltage terminal VOUT via the diode D1, the capacitor C1, the diode D2, and the capacitor C2. As such, the switching power supply 1100 completes the high-voltage startup, and begins to work.

It should be noted that, the main circuit according to the second embodiment is not limited to the structure shown in FIG. 18, and those skilled in the art should understand that, the main circuit may be other proper boost circuit.

Third Embodiment

Figure 19:
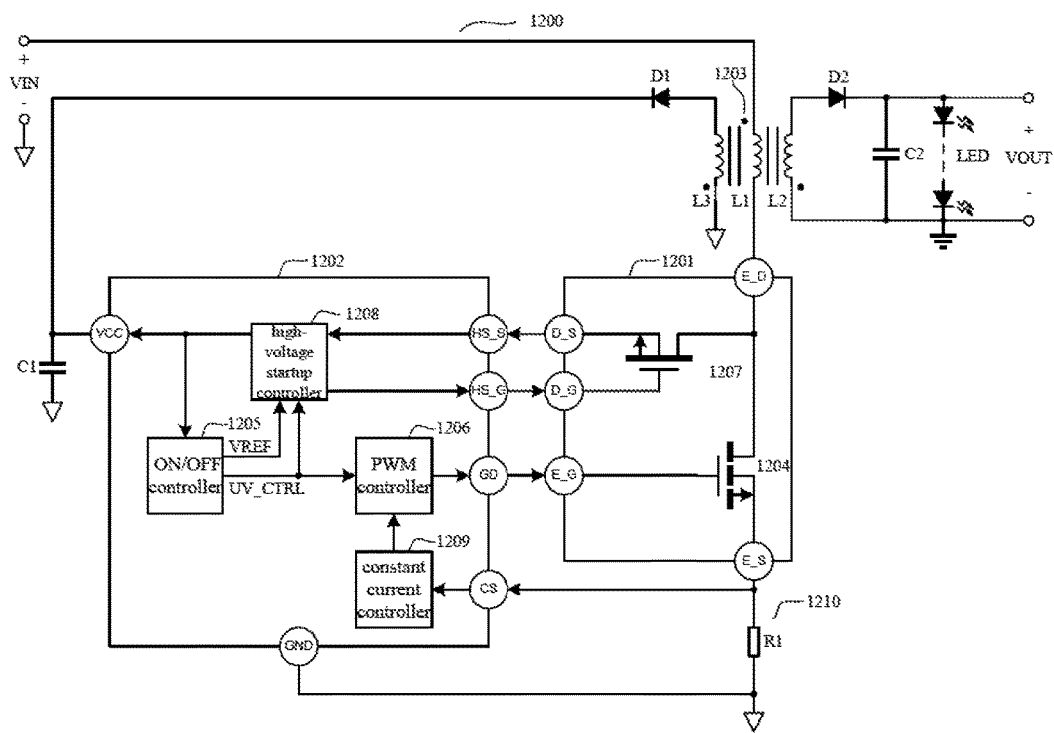
FIG. 19 is a circuit schematic diagram of an isolated primary-side feedback switching power supply according to a third embodiment of present invention.

Referring to FIG. 19, it shows a circuit schematic diagram of an isolated primary-side feedback switching power supply 1200 according to a third embodiment of present invention. The switching power supply 1200 may be used to drive an LED load. The switching power supply 1200 includes a composite device 1201, a switching power supply control device 1202, a flyback converter 1203 and a primary-side feedback circuit 1210. As a non-limiting example, the primary-side feedback circuit 1210 includes a sampling resistor R1.

The structure and operational principle of the composite device 1201 are the same as the composite device 501 according to the first embodiment shown in FIG. 7, and will not be repeated here. However, a source E_S of a power transistor 1204 in the composite device 1201 is coupled to one terminal of the sampling resistor R1 in the primary-side feedback circuit 1210 and to a constant current sampling terminal CS of the switching power supply control device 1202.

The switching power supply control device 1202 includes an ON/OFF controller 1205, a PWM controller 1206, a high-voltage startup controller 1208 and a constant current controller 1209. The structures and operational principles of the ON/OFF controller 1205 and the high-voltage startup controller 1208 are the same as the ON/OFF controller 505 and the high-voltage startup controller 508 in the switching power supply control device 502 according to the first embodiment shown in FIG. 7, and will not be repeated here.

However, in addition to the same structure and operational principle as the PWM controller 506 in the switching power supply control device 502 according to the first embodiment shown in FIG. 7, the PWM controller 1206 in the switching power supply control device 1202 further has a second input coupled to an output of the constant current controller 1209, wherein the second input functions to control the ON time of the PWM signal generated by the PWM controller 1206, so as to achieve constant current control.

Also, the constant current controller 1209 in the switching power supply control device 1202 functions to control the output constant current of the switching power supply 1200. The constant current controller 1209 has an input coupled to the constant current sampling terminal CS of the switching power supply control device 1202; the constant current controller 1209 has an output coupled to the second input of the PWM controller 1206; the constant current sampling terminal CS of the switching power supply control device 1202 is coupled to one terminal of the sampling resistor R1 in the primary-side feedback circuit 1210 and to the source E_S of the power transistor 1204 in the composite device 1201.

In addition to the same structure and operational principle as the flyback converter 503 according to the first embodiment shown in FIG. 7, the flyback converter 1203 further has an output load LED. The anode of the output load LED is coupled to the DC output voltage terminal VOUT, and the cathode of the output load LED is coupled to ground.

The primary-side feedback circuit 1210 is used for the sampling and feedback for a primary-side current of the switching power supply 1200. The primary-side feedback circuit 1210 includes a sampling resistor R1, which has one terminal coupled to the source E_S of the power transistor 1204 in the composite device 1201 and to a primary-side sampling terminal CS of the switching power supply control device 1202, and has the other terminal coupled to ground.

Similar to the first embodiment, the operational principle for the high-voltage startup of the isolated primary-side feedback switching power supply 1200 for driving an LED is outlined as follow:

When the switching power supply 1200 initiates the high-voltage startup, the voltage at the power supply terminal VCC of the switching power supply control device 1202 is 0 and lower than the turn-off voltage VCCOFF of the ON/OFF controller 1205, then the high-voltage startup controller 1208 controls to turn on the depletion transistor 1207 in the composite device 1201, and the AC input voltage VIN supplies the high-voltage startup charging current to the power supply terminal VCC via the primary winding L1 of the transformer in the flyback converter 1203, the depletion transistor 1207 and the high-voltage startup controller 1208, such that the voltage at the power supply terminal VCC rises; when the voltage at the power supply terminal VCC rises above the turn-on voltage VCCON of the ON/OFF controller 1205, the high-voltage startup controller 1208 controls to turn off the depletion transistor 1207 in the composite device 1201, and the AC input voltage VIN stops supplying the high-voltage startup charging current to the power supply terminal VCC via the primary winding L1 of the transformer in the flyback converter 1203, the depletion transistor 1207 and the high-voltage startup controller 1208, and the power supply terminal VCC is instead powered by the AC input voltage VIN via the primary winding L1 and the auxiliary winding L3 of the transformer in the flyback converter 1203, the diode D1 and the startup capacitor C1. As such, the switching power supply 1200 completes the high-voltage startup, and begins to work.

Fourth Embodiment

Figure 20:
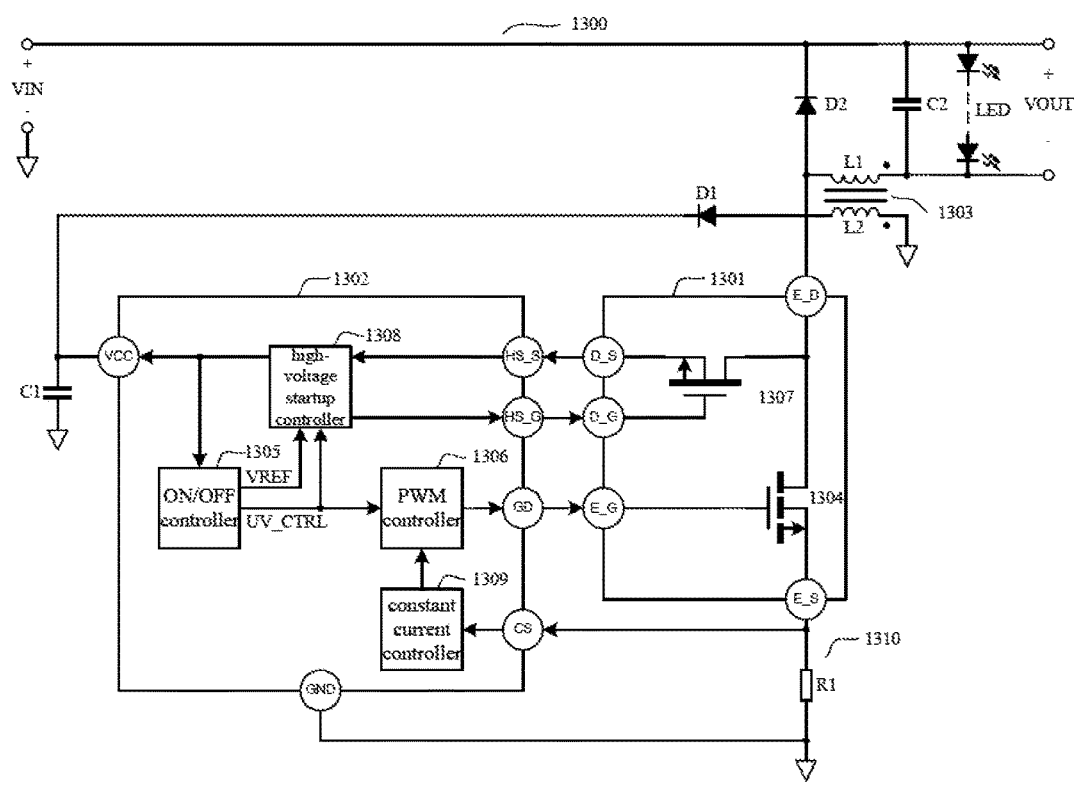
FIG. 20 is a circuit schematic diagram of a non-isolated true ground switching power supply according to a fourth embodiment of present invention.

Referring to FIG. 20, it shows a circuit schematic diagram of a non-isolated true ground switching power supply 1300 according to a fourth embodiment of present invention. The switching power supply 1300 may be used to drive an LED load. The switching power supply 1300 includes a composite device 1301, a switching power supply control device 1302, a converter 1303 and a primary-side feedback circuit 1310. The primary-side feedback circuit 1310 may include for example a sampling resistor R1.

The structure and operational principle of the composite device 1301 are the same as the composite device 501 according to the first embodiment shown in FIG. 7, and will not be repeated here. However, a common drain E_D of a power transistor 1304 and a depletion transistor 1307 in the composite device 1301 are coupled to the anode of the diode D2 and to the synonym terminal of the primary winding L1 of the transformer in the converter 1303; a source E_S of the power transistor 1304 in the composite device 1301 is coupled to one terminal of the sampling resistor R1 in the primary-side feedback circuit 1310 and to a constant current sampling terminal CS of the switching power supply control device 1302.

The switching power supply control device 1302 includes an ON/OFF controller 1305, a PWM controller 1306, a high-voltage startup controller 1308 and a constant current controller 1309. The structures and operational principles of the ON/OFF controller 1305 and the high-voltage startup controller 1308 are the same as the ON/OFF controller 505 and the high-voltage startup controller 508 in the switching power supply control device 502 according to the first embodiment shown in FIG. 7, and will not be repeated here.

However, in addition to the same structure and operational principle as the PWM controller 506 in the switching power supply control device 502 according to the first embodiment shown in FIG. 7, the PWM controller 1306 in the switching power supply control device 1302 further has a second input coupled to an output of the constant current controller 1309, wherein the second input functions to control the ON time of the PWM signal generated by the PWM controller 1306.

Additionally, the constant current controller 1309 in the switching power supply control device 1302 functions to control the output constant current of the switching power supply 1300. The constant current controller 1309 has an input coupled to the constant current sampling terminal CS of the switching power supply control device 1302; the constant current controller 1309 has an output coupled to the second input of the PWM controller 1306; the constant current sampling terminal CS of the switching power supply control device 1302 is coupled to one terminal of the sampling resistor R1 in the primary-side feedback circuit 1310 and to the source E_S of the power transistor 1304 in the composite device 1301.

The converter 1303 converts the AC input voltage VIN into a voltage at the DC output voltage terminal VOUT. The converter 1303 includes a startup capacitor C1, a diode D1, a diode D2, an output filter capacitor C2, an output load LED, a primary winding L1 and a secondary winding L2 of a transformer. The AC input voltage VIN is coupled to the cathode of the diode D2, one terminal of the output filter capacitor C2, the anode of the output load LED and the DC output voltage terminal VOUT; the anode of the diode D2 is coupled to the synonym terminal of the primary winding L1 of the transformer and to the common drain E_D of the power transistor 1304 and the depletion transistor 1307 in the composite device 1301; the other terminal of the output filter capacitor C2 is coupled to the dotted terminal of the primary winding L1 of the transformer and the cathode of the output load LED; the dotted terminal of the secondary winding L2 of the transformer is coupled to ground; the synonym terminal of the secondary winding L2 of the transformer is coupled to the anode of the diode D1; the cathode of the diode D1 is coupled to one terminal of the startup capacitor C1 and to the power supply terminal VCC of the switching power supply control device 1302; the other terminal of the startup capacitor C1 is coupled to ground.

The primary-side feedback circuit 1310 is used for the sampling and feedback for a primary-side current of the switching power supply 1300. The primary-side feedback circuit 1310 may include a sampling resistor R1, wherein one terminal of the sampling resistor R1 is coupled to the source E_S of the power transistor 1304 in the composite device 1301 and to a primary-side sampling terminal CS of the switching power supply control device 1302, and the other terminal of the sampling resistor R1 is coupled to ground.

Similar to the first embodiment, the operational principle for the high-voltage startup of the non-isolated true ground switching power supply 1300 for driving an LED is outlined as follow:

When the switching power supply 1300 initiates the high-voltage startup, the voltage at the power supply terminal VCC of the switching power supply control device 1302 is 0 and lower than the turn-off voltage VCCOFF of the ON/OFF controller 1305, then the high-voltage startup controller 1308 controls to turn on the depletion transistor 1307 in the composite device 1301, and the AC input voltage VIN supplies the high-voltage startup charging current to the power supply terminal VCC via the output load LED and the primary winding L1 of the transformer in the converter 1303, such that the voltage at the power supply terminal VCC rises; when the voltage at the power supply terminal VCC rises above the turn-on voltage VCCON of the ON/OFF controller 1305, the high-voltage startup controller 1308 controls to turn off the depletion transistor 1307 in the composite device 1301, and the AC input voltage VIN stops supplying the high-voltage startup charging current to the power supply terminal VCC via the output load LED and the primary winding L1 of the transformer in the converter 1303, and the power supply terminal VCC is instead powered by the DC output voltage terminal VOUT via the primary winding L1 and the secondary winding L2 of the transformer in the converter 1303, the diode D1 and the startup capacitor C1. As such, the switching power supply 1300 completes the high-voltage startup, and begins to work.

Fifth Embodiment

Figure 21:
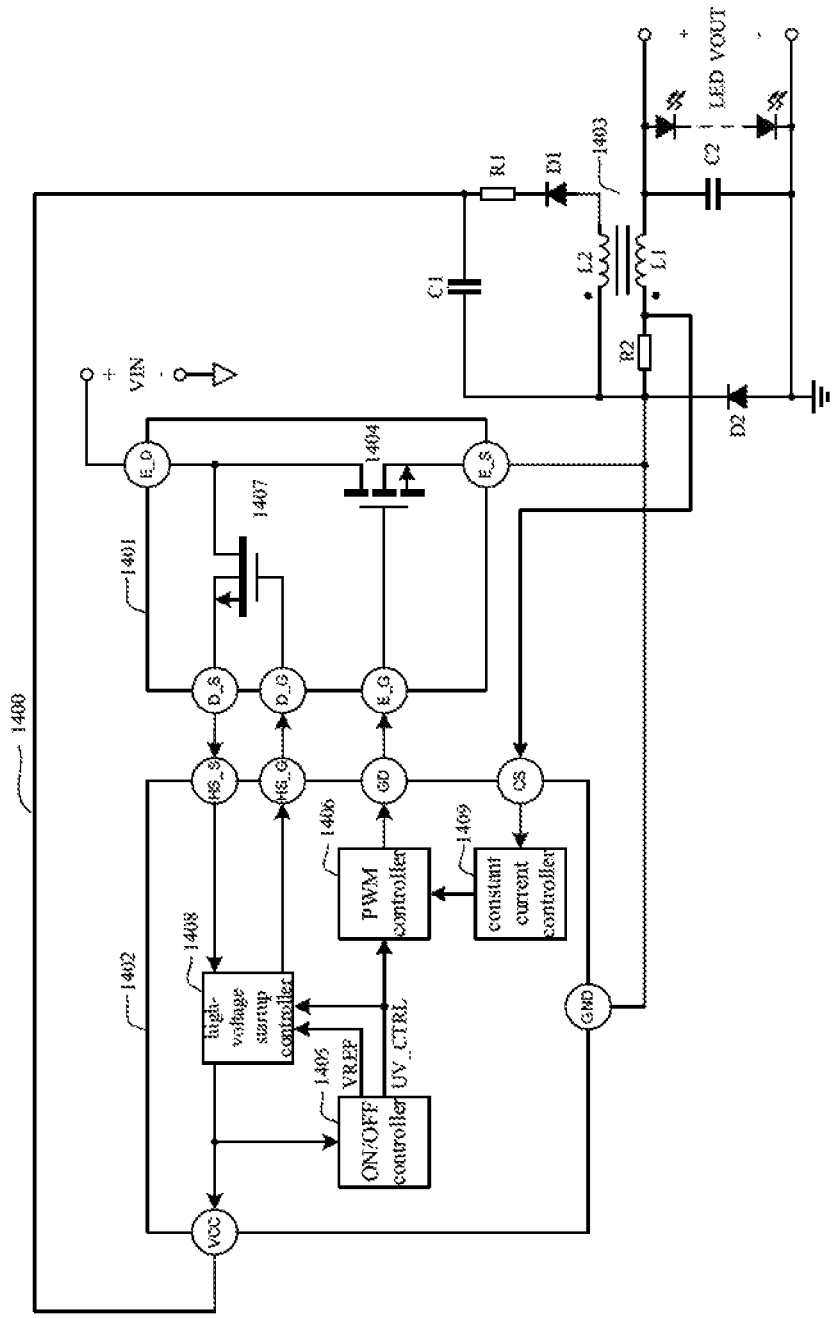
FIG. 21 is a circuit schematic diagram of a buck floating ground switching power supply according to a fifth embodiment of present invention.

Referring to FIG. 21, it shows a circuit schematic diagram of a buck floating ground switching power supply 1400 for driving an LED according to a fifth embodiment of present invention. The switching power supply 1400 includes a composite device 1401, a switching power supply control device 1402 and a buck circuit 1403.

The structure and operational principle of the composite device 1401 are the same as the composite device 501 according to the first embodiment shown in FIG. 7, and will not be repeated here. However, a common drain E_D of a power transistor 1404 and a depletion transistor 1407 in the composite device 1401 is coupled to the AC input voltage VIN of the switching power supply 1400; a source E_S of the power transistor 1404 in the composite device 1401 is coupled to a ground terminal GND of the switching power supply control device 1402, and to the cathode of the diode D2, one terminal of the sampling resistor R2, the dotted terminal of the secondary winding L2 of the transformer, and one terminal of the startup capacitor C1 in the buck circuit 1403.

The switching power supply control device 1402 includes an ON/OFF controller 1405, a PWM controller 1406, a high-voltage startup controller 1408 and a constant current controller 1409. The structures and operational principles of the ON/OFF controller 1405 and the high-voltage startup controller 1408 are the same as the ON/OFF controller 505 and the high-voltage startup controller 508 in the switching power supply control device 502 according to the first embodiment shown in FIG. 7, and will not be repeated here.

However, in addition to the same structure and operational principle as the PWM controller 506 in the switching power supply control device 502 according to the first embodiment shown in FIG. 7, the PWM controller 1406 in the switching power supply control device 1402 further has a second input coupled to an output of the constant current controller 1409, wherein the second input functions to control the ON time of the PWM signal generated by the PWM controller 1406.

Also, the constant current controller 1409 in the switching power supply control device 1402 functions to control the output constant current of the switching power supply 1400. The constant current controller 1409 has an input coupled to the constant current sampling terminal CS of the switching power supply control device 1402; the constant current controller 1409 has an output coupled to the second input of the PWM controller 1406; the constant current sampling terminal CS of the switching power supply control device 1402 is coupled to the other terminal of the sampling resistor R2 and the dotted terminal of the primary winding L1 of the transformer in the buck circuit 1403.

The buck circuit 1403 includes a diode D1, a resistor R1, a startup capacitor C1, a sampling resistor R2, a diode D2, an output filter capacitor C2, an output load LED, a primary winding L1 and a secondary winding L2 of a transformer. One terminal of the sampling resistor R2 is coupled to the source E_S of the power transistor 1404 in the composite device 1401, a ground terminal GND of the switching power supply control device 1402, the cathode of the diode D2, the dotted terminal of the secondary winding L2 of the transformer and one terminal of the startup capacitor C1; the other terminal of the sampling resistor R2 is coupled to the primary-side sampling terminal CS of the switching power supply control device 1402 and the dotted terminal of the primary winding L1 of the transformer; the anode of the diode D2 is coupled to ground; the synonym terminal of the primary winding L1 of the transformer is coupled to one terminal of the output filter capacitor C2, the anode of the output load LED and the DC output voltage terminal VOUT; the other terminal of the capacitor C2 is coupled to ground; the cathode of the output load LED is coupled to ground; the synonym terminal of the secondary winding L2 of the transformer is coupled to the anode of the diode D1; the cathode of the diode D1 is coupled to one terminal of the resistor R1; the other terminal of the resistor R1 is coupled to the other terminal of the startup capacitor C1 and the power supply terminal VCC of the switching power supply control device 1402.

Similar to the first embodiment, the operational principle for the high-voltage startup of the buck floating ground switching power supply 1400 for driving an LED is outlined as follow:

When the switching power supply 1400 initiates the high-voltage startup, the voltage at the power supply terminal VCC of the switching power supply control device 1402 is 0 and lower than the turn-off voltage VCCOFF of the ON/OFF controller 1405, then the high-voltage startup controller 1408 controls to turn on the depletion transistor 1407 in the composite device 1401, and the AC input voltage VIN supplies the high-voltage startup charging current to the power supply terminal VCC via the depletion transistor 1407 and the high-voltage startup controller 1408, such that the voltage at the power supply terminal VCC rises; when the voltage at the power supply terminal VCC rises above the turn-on voltage VCCON of the ON/OFF controller 1405, the high-voltage startup controller 1408 controls to turn off the depletion transistor 1407 in the composite device 1401, and the AC input voltage VIN stops supplying the high-voltage startup charging current to the power supply terminal VCC via the depletion transistor 1407 and the high-voltage startup controller 1408, and the power supply terminal VCC is instead powered by the DC output voltage terminal VOUT via the primary winding L1 and the secondary winding L2 of the transformer, the diode D1, the resistor R1 and the capacitor C1 in the buck circuit 1403. As such, the switching power supply 1400 completes the high-voltage startup, and begins to work.

Sixth Embodiment

Figure 22:
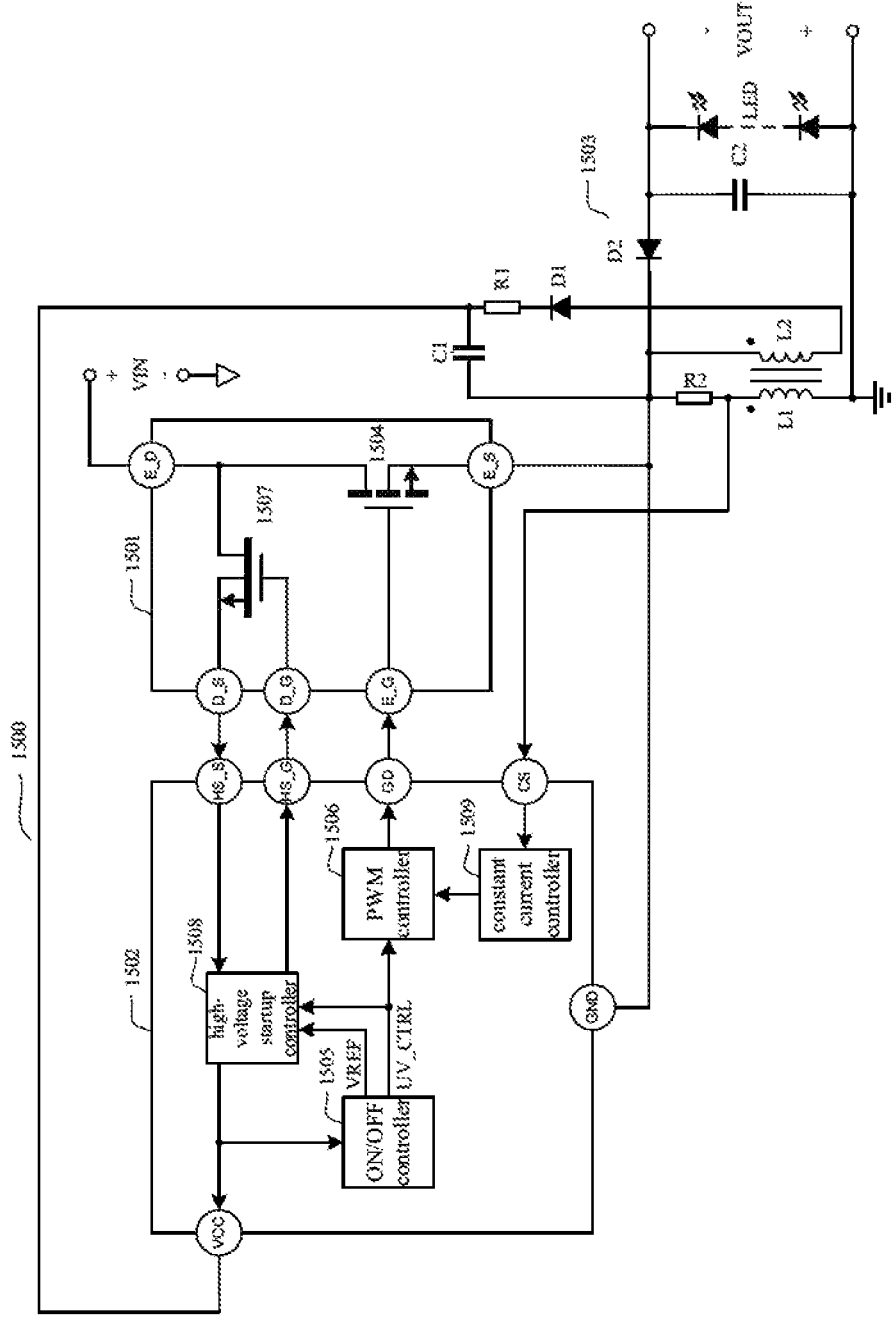
FIG. 22 is a circuit schematic diagram of a buck-boost floating ground switching power supply according to a sixth embodiment of present invention.

Referring to FIG. 22, it shows a circuit schematic diagram of a buck-boost floating ground switching power supply 1500 for driving an LED according to a sixth embodiment of present invention. The switching power supply 1500 includes a composite device 1501, a switching power supply control device 1502 and a buck-boost circuit 1503.

The structure and operational principle of the composite device 1501 are the same as the composite device 501 according to the first embodiment shown in FIG. 7, and will not be repeated here. However, a common drain E_D of a power transistor 1504 and a depletion transistor 1507 in the composite device 1501 is coupled to the AC input voltage VIN of the switching power supply 1500; a source E_S of the power transistor 1504 in the composite device 1501 is coupled to a ground terminal GND of the switching power supply control device 1502, and to the cathode of the diode D2, one terminal of the sampling resistor R2, the dotted terminal of the secondary winding L2 of the transformer, and one terminal of the startup capacitor C1 in the buck-boost circuit 1503.

The switching power supply control device 1502 includes an ON/OFF controller 1505, a PWM controller 1506, a high-voltage startup controller 1508 and a constant current controller 1509. The structures and operational principles of the ON/OFF controller 1505 and the high-voltage startup controller 1508 are the same as the ON/OFF controller 505 and the high-voltage startup controller 508 in the switching power supply control device 502 according to the first embodiment shown in FIG. 7, and will not be repeated here.

However, in addition to the same structure and operational principle as the PWM controller 506 in the switching power supply control device 502 according to the first embodiment shown in FIG. 7, the PWM controller 1506 in the switching power supply control device 1502 further has a second input coupled to an output of the constant current controller 1509, wherein the second input functions to control the ON time of the PWM signal generated by the PWM controller 1506.

In addition, the constant current controller 1509 in the switching power supply control device 1502 functions to control the output constant current of the switching power supply 1500. The constant current controller 1509 has an input coupled to a primary-side sampling terminal CS of the switching power supply control device 1502; the constant current controller 1509 has an output coupled to the second input of the PWM controller 1506; the constant current sampling terminal CS of the switching power supply control device 1502 is coupled to the other terminal of the sampling resistor R2 and the dotted terminal of the primary winding L1 of the transformer in the buck-boost circuit 1503.

The buck-boost circuit 1503 includes a diode D1, a resistor R1, a startup capacitor C1, a sampling resistor R2, a diode D2, an output filter capacitor C2, an output load LED, a primary winding L1 and a secondary winding L2 of a transformer. One terminal of the sampling resistor R2 is coupled to the source E_S of the power transistor 1504 in the composite device 1501, a ground terminal GND of the switching power supply control device 1502, the cathode of the diode D2, the dotted terminal of the secondary winding L2 of the transformer and one terminal of the startup capacitor C1; the other terminal of the sampling resistor R2 is coupled to the primary-side sampling terminal CS of the switching power supply control device 1502 and the dotted terminal of the primary winding L1 of the transformer; the synonym terminal of the primary winding L1 of the transformer is coupled to ground; the anode of the diode D2 is coupled to one terminal of the output filter capacitor C2, the cathode of the output load LED and the DC output voltage terminal VOUT; the other terminal of the capacitor C2 is coupled to ground; the anode of the output load LED is coupled to ground; the synonym terminal of the secondary winding L2 of the transformer is coupled to the anode of the diode D1; the cathode of the diode D1 is coupled to one terminal of the resistor R1; the other terminal of the resistor R1 is coupled to the other terminal of the startup capacitor C1 and the power supply terminal VCC of the switching power supply control device 1502.

Similar to the first embodiment, the operational principle for the high-voltage startup of the buck-boost floating ground switching power supply 1500 for driving an LED is outlined as follow:

When the switching power supply 1500 initiates the high-voltage startup, the voltage at the power supply terminal VCC of the switching power supply control device 1502 is 0 and lower than the turn-off voltage VCCOFF of the ON/OFF controller 1505, then the high-voltage startup controller 1508 controls to turn on the depletion transistor 1507 in the composite device 1501, and the AC input voltage VIN supplies the high-voltage startup charging current to the power supply terminal VCC via the depletion transistor 1507 and the high-voltage startup controller 1508, such that the voltage at the power supply terminal VCC rises; when the voltage at the power supply terminal VCC rises above the turn-on voltage VCCON of the ON/OFF controller 1505, the high-voltage startup controller 1508 controls to turn off the depletion transistor 1507 in the composite device 1501, and the AC input voltage VIN stops supplying the high-voltage startup charging current to the power supply terminal VCC via the depletion transistor 1507 and the high-voltage startup controller 1508, and the power supply terminal VCC is instead powered by the DC output voltage terminal VOUT via the diode D2, the sampling resistor R2, the primary winding L1 and the secondary winding L2 of the transformer, the diode D1, the resistor R1 and the capacitor C1 in the buck-boost circuit 1503. As such, the switching power supply 1500 completes the high-voltage startup, and begins to work.

Seventh Embodiment

Figure 23:
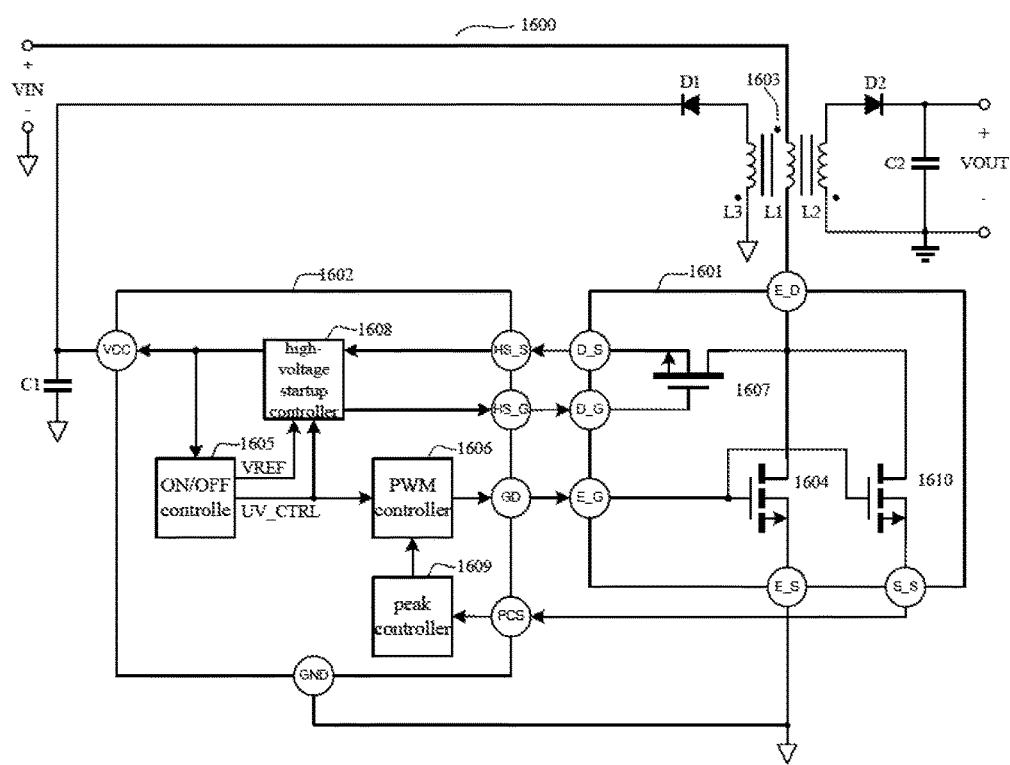
FIG. 23 is a circuit schematic diagram of a flyback switching power supply integrating a sampling transistor according to a seventh embodiment of present invention.

Referring to FIG. 23, it shows a circuit schematic diagram of a flyback switching power supply 1600 integrating a sampling transistor according to a seventh embodiment of present invention. The switching power supply 1600 includes a composite device 1601, a switching power supply control device 1602 and a flyback converter 1603.

The composite device 1601 includes a power transistor 1604, a depletion transistor 1607 and a sampling transistor 1610. The structures and operational principles of the power transistor 1604 and the depletion transistor 1607 are the same as the power transistor 504 and the depletion transistor 507 in the composite device 501 according to the first embodiment shown in FIG. 7, and will not be repeated here. The sampling transistor 1610 functions to sample a peak current of the power transistor 1604. The sampling transistor 1610 has a drain coupled to a common drain of the power transistor 1604 and the depletion transistor 1607 and to an input signal terminal E_D of the composite device 1601; the sampling transistor 1610 has a gate coupled to a gate of the power transistor 1604 and an input E_G of the composite device 1601; the sampling transistor 1610 has a substrate coupled to a source of the sampling transistor 1610; the sampling transistor 1610 has a source coupled to an output S_S of the composite device 1601; the output S_S of the composite device 1601 is coupled to a peak sampling terminal PCS of the switching power supply control device 1602.

The switching power supply control device 1602 includes an ON/OFF controller 1605, a PWM controller 1606, a high-voltage startup controller 1608 and a peak controller

1609. The structures and operational principles of the ON/OFF controller 1605 and the high-voltage startup controller 1608 are the same as the ON/OFF controller 505 and the high-voltage startup controller 508 in the switching power supply control device 502 according to the first embodiment shown in FIG. 7, and will not be repeated here.

However, in addition to the same structure and operational principle as the PWM controller 506 in the switching power supply control device 502 according to the first embodiment shown in FIG. 7, the PWM controller 1606 in the switching power supply control device 1602 further has a second input coupled to an output of the peak controller 1609, wherein the second input functions to control the ON time of the PWM signal generated by the PWM controller 1606.

In addition, the peak controller 1609 in the switching power supply control device 1602 functions to control the peak current in the switching power supply 1600. An input of the peak controller 1609 is coupled to the peak sampling terminal PCS of the switching power supply control device 1602; an output of the peak controller 1609 is coupled to the second input of the PWM controller 1606; and the peak sampling terminal PCS of the switching power supply control device 1602 is coupled to the source S_S of the sampling transistor 1610 in the composite device 1601.

The structure and operational principle of the flyback converter 1603 are the same as the flyback converter 503 according to the first embodiment shown in FIG. 7, and will not be repeated here.

As a preferred embodiment, the depletion transistor 1607, the sampling transistor 1610 and the power transistor 1604 may be integrated in one same composite device. In other words, the depletion transistor 1607 and the sampling transistor 1610 may be integrated on the power transistor 1604 to further reduce the chip area of the switching power supply 1600, thereby further reducing the cost of the switching power supply 1600.

Figure 24:
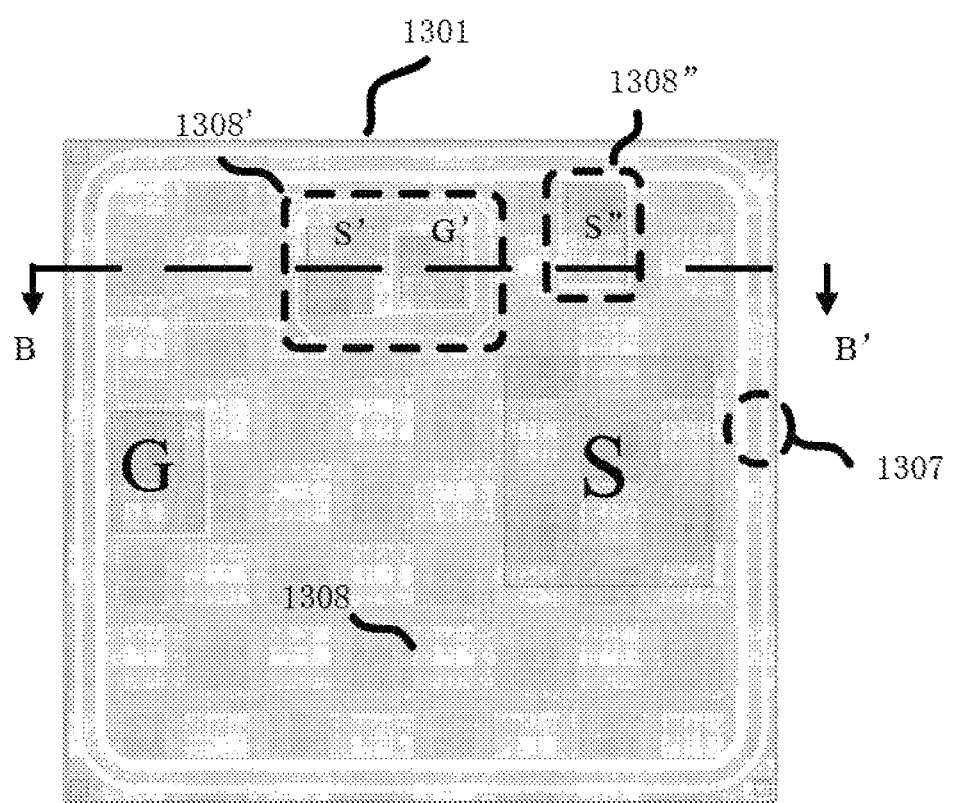
FIG. 24 is a layout schematic diagram of a composite device in the flyback switching power supply integrating the sampling transistor according to the seventh embodiment of present invention.

Referring to FIG. 24, it shows a layout schematic diagram of the composite device 1601 in the flyback switching power supply 1600 integrating a sampling transistor in the seventh embodiment.

On a front side of the layout 1301, there are the gate G of the power transistor and the sampling transistor, the source S of the power transistor, the source S" of the sampling transistor, as well as the source S' and the gate G' of the depletion transistor. The drains of the composite device are located on a back side of the layout 1301. Region 1308' is the active region of the depletion transistor, region 1308" is the active region of the sampling transistor, and region 1308 is the active region of the power transistor.

Figure 25:
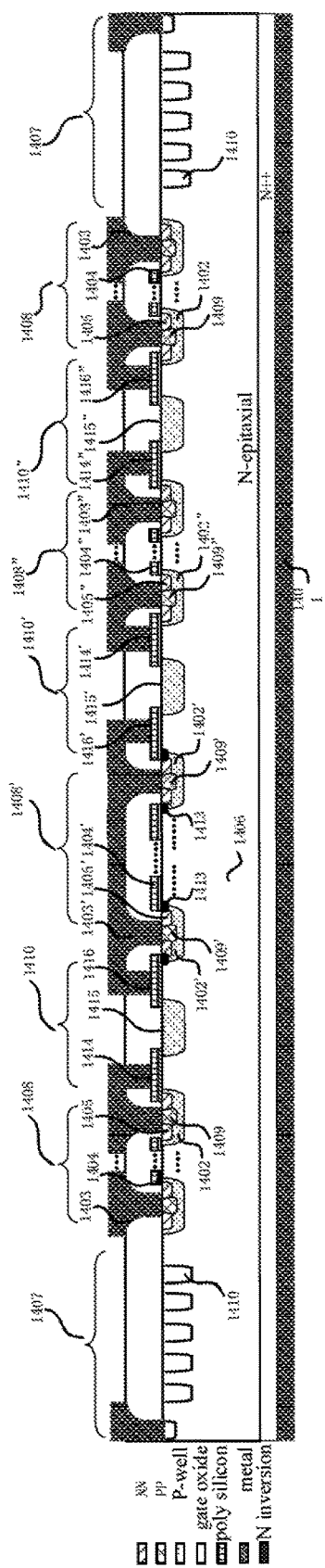
FIG. 25 is a cross-sectional view along a direction CC' of the composite device in FIG. 24.

Referring to FIG. 25, it shows a longitudinal cross-sectional view along a direction BB' in FIG. 24.

The composite device includes a cell portion 1408 of the power transistor, a cell portion 1408' of the depletion transistor, and a cell portion 1408" of the sampling transistor, wherein the three cell portions are active regions. Taking an N-type device as an example, the composite device may include:

an N-type doped epitaxial region 1406 having a first electrode 1401 on a back side thereof, wherein the epitaxial region 1406 is shorted to the first electrode 1401 to form the drains of the power transistor, the depletion transistor and the sampling transistor;

a power transistor well region 1402, a depletion transistor well region 1402' and a sampling transistor well region 1402" of P-type doping, formed on a front side of the epitaxial region 1406;

an N-type doped power transistor doped region 1405 formed in the power transistor well region 1402;

an N-type doped depletion transistor doped region 1405' formed in the depletion transistor well region 1402';

an N-type doped sampling transistor doped region 1405" formed in the sampling transistor well region 1402";

an N-type doped channel region 1413 within the depletion transistor well region 1402', wherein the channel region 1413 extends from a boundary of the depletion transistor well region 1402' to a boundary of the depletion transistor doped region 1405';

a gate 1404 of the power transistor formed on the front side of the epitaxial region 1406, wherein the gate 1404 of the power transistor covers at least a portion of the power transistor doped region 1405 and extends onto the epitaxial region 1406 outside the power transistor well region 1402;

a gate 1404' of the depletion transistor formed on the front side of the epitaxial region 1406, wherein the gate 1404' of the depletion transistor covers the channel region 1413 and extends onto the epitaxial region 1406 outside the depletion transistor well region 1402';

a gate 1404" of the sampling transistor formed on the front side of the epitaxial region 1406, the gate 1404" of the sampling transistor covers at least a portion of the sampling transistor doped region 1405" and extends onto the epitaxial region 1406 outside the sampling transistor well region 1402";

a first P-type doped leading-out region 1409, which is formed in parallel with the power transistor doped region 1405 within the power transistor well region 1402;

a second P-type doped leading-out region 1409', which is formed in parallel with the depletion transistor doped region 1405' within the depletion transistor well region 1402'; and a third P-type doped leading-out region 1409", which is formed in parallel with the sampling transistor doped region 1405" within the sampling transistor well region 1402".

The power transistor well region 1402, the first leading-out region 1409 and the power transistor doped region 1405 are shorted via a second electrode 1403, to form the source of the power transistor; the depletion transistor well region 1402', the depletion transistor leading-out region 1409' and the depletion transistor doped region 1405' are shorted via a third electrode 1403', to form the source of the depletion transistor; the sampling transistor well region 1402", the third leading-out region 1409" and the sampling transistor doped region 1405" are shorted via a fourth electrode 1403", to form the source of the sampling transistor.

The gate 1404 of the power transistor, the gate 1404' of the depletion transistor and the gate 1404" of the sampling transistor may each include a gate dielectric layer and a gate electrode on the gate dielectric layer. The gate electrode may be a polysilicon gate electrode, for example.

The composite device may further integrate therein an isolator 1410 to isolate the power transistor from the depletion transistor, wherein the isolator 1410 may be located between the cell portion 1408 of the power transistor and the cell portion 1408' of the depletion transistor.

Further, the isolator 1410 may include:

a P-type doped floating well region 1415, which is formed in parallel with the power transistor well region 1402 and the depletion transistor well region 1402' on the front side of the epitaxial region 1406, wherein the floating well region 1415 is located between the power transistor well region 1402 and the depletion transistor well region 1402';

a first gate 1414 formed on the front side of the epitaxial region 1406, wherein the first gate 1414 covers at least a portion of the floating well region 1415 and at least a portion of the power transistor well region 1402, the first gate 1414 further covers the epitaxial region 1406 between the floating well region 1415 and the power transistor well region 1402; and a second gate 1416 formed on the front side of the epitaxial region 1406, wherein the second gate 1416 covers at least a portion of the floating well region 1415 and at least a portion of the depletion transistor well region 1402', the second gate 1416 further covers the epitaxial region 1406 between the floating well region 1415 and the depletion transistor well region 1402'.

The first gate 1414 and the power transistor well region 1402 are shorted, e.g., shorted via the second electrode 1403, but are not so limited; the second gate 1416 and the depletion transistor well region 1402' are shorted, e.g., shorted via the third electrode 1403', but are not so limited.

The composite device may also integrate therein an isolator 1410' to isolate the depletion transistor from the sampling transistor. The isolator 1410' may be located between the cell portion 1408" of the sampling transistor and the cell portion 1408' of the depletion transistor. The isolator 1410' may include:

a P-type doped floating well region 1415', which is formed in parallel with the sampling transistor well region 1402" and the depletion transistor well region 1402' on the front side of the epitaxial region 1406, wherein the floating well region 1415' is located between the sampling transistor well region 1402" and the depletion transistor well region 1402';

a third gate 1414' formed on the front side of the epitaxial region 1406, wherein the third gate 1414' covers at least a portion of the floating well region 1415' and at least a portion of the sampling transistor well region 1402", the third gate 1414' further covers the epitaxial region 1406 between the floating well region 1415' and the sampling transistor well region 1402"; and a fourth gate 1416' formed on the front side of the epitaxial region 1406, wherein the fourth gate 1416' covers at least a portion of the floating well region 1415' and at least a portion of the depletion transistor well region 1402', the fourth gate 1416' further covers the epitaxial region 1406 between the floating well region 1415' and the depletion transistor well region 1402'.

The third gate 1414' and the sampling transistor well region 1402" are shorted, e.g., shorted via the fourth electrode 1403", but are not so limited; the fourth gate 1416' and the depletion transistor well region 1402' are shorted, e.g., shorted via the third electrode 1403', but are not so limited.

The composite device may also integrate therein an isolator 1410" to isolate the power transistor from the sampling transistor. The isolator 1410" may be located between the cell portion 1408" of the sampling transistor and the cell portion 1408 of the power transistor. The isolator 1410" may include:

a P-type doped floating well region 1415", which is formed in parallel with the sampling transistor well region 1402" and the power transistor well region 1402 on the front side of the epitaxial region 1406, wherein the floating well region 1415" is located between the sampling transistor well region 1402" and the power transistor well region 1402;

a fifth gate 1414" formed on the front side of the epitaxial region 1406, the fifth gate 1414" covers at least a portion of the floating well region 1415" and at least a portion of the sampling transistor well region 1402", the fifth gate 1414" further covers the epitaxial region 1406 between the floating well region 1415" and the sampling transistor well region 1402"; and a sixth gate 1416" formed on the front side of the epitaxial region 1406, the sixth gate 1416" covers at least a portion of the floating well region 1415" and at least a portion of the power transistor well region 1402, the sixth gate 1416" further covers the epitaxial region 1406 between the floating well region 1415" and the power transistor well region 1402.

The fifth gate 1414" and the sampling transistor well region 1402" are shorted, e.g., shorted via the fourth electrode 1403", but are not so limited; the sixth gate 1416" and the power transistor well region 1402 are shorted, e.g., shorted via the second electrode 1403, but are not so limited.

The floating well region 1415, the floating well region 1415' and the floating well region 1415" may be formed by the same implantation process as the power transistor well region 1402, the depletion transistor well region 1402' and the sampling transistor well region 1402". The first gate 1414, the second gate 1416, the third gate 1414', the fourth gate 1416', the fifth gate 1414", and the sixth gate 1416" may each include a gate dielectric layer and a gate electrode on the gate dielectric layer. The gate electrode may be a polysilicon gate electrode, for example.

There may be a high-voltage ring 1407 in an area outside the cell portion 1408 of the power transistor, the cell portion 1408' of the depletion transistor and the cell portion 1408" of the sampling transistor, wherein the high-voltage ring 1407 may include a plurality of P-type doped regions 1410, and may correspond to the region 1307 shown in FIG. 24.

In connection with FIG. 24 and FIG. 25, the three devices above may be located within the same high-voltage ring 1407, which has the same structure as the high-voltage ring for the enhancement-mode MOS device or the depletion-mode MOS device. Depending on specific applications, the requirements on the currents of the devices may vary, and the area of the active regions 1308, 1308' and 1308" may be adjusted accordingly, in order to meet the requirements of the practical applications.

It should be noted that, although FIG. 25 shows that the isolator 1410, the isolator 1410' and the isolator 1410" in the composite device have the same structure as the isolator 610 (see FIG. 8) in the first instance of the composite device according to the first embodiment, the isolators in other instances (i.e., the isolators shown in FIGS. 10-13) of the composite device according to the first embodiment are applicable to the composite structure in the seventh embodiment. To avoid unnecessary repetition, they are not individually described in further details.

Similar to the first embodiment, the operational principle for the high-voltage startup of the flyback switching power supply 1600 integrating the sampling transistor is outlined as follow:

When the switching power supply 1600 initiates the high-voltage startup, the voltage at the power supply terminal VCC of the switching power supply control device 1602 is 0 and lower than the turn-off voltage VCCOFF of the ON/OFF controller 1605, then the high-voltage startup controller 1608 controls to turn on the depletion transistor 1607 in the composite device 1601, and the AC input voltage VIN supplies the high-voltage startup charging current to the power supply terminal VCC via the primary winding L1 of the transformer in the flyback converter 1603, the depletion transistor 1607 and the high-voltage startup controller 1608, such that the voltage at the power supply terminal VCC rises; when the voltage at the power supply terminal VCC rises above the turn-on voltage VCCON of the ON/OFF controller 1605, the high-voltage startup controller 1608 controls to turn off the depletion transistor 1607 in the composite device 1601, and the AC input voltage VIN stops supplying the high-voltage startup charging current to the power supply terminal VCC via the primary winding L1 of the transformer in the flyback converter 1603, the depletion transistor 1607 and the high-voltage startup controller 1608, and the power supply terminal VCC is instead powered by the AC input voltage VIN via the primary winding L1 and the auxiliary winding L3 of the transformer in the flyback converter 1603, the diode D1 and the startup capacitor C1. As such, the switching power supply 1600 completes the high-voltage startup, and begins to work.

The foregoing is merely preferred embodiments of present invention and is not intended to be limiting to present invention in any manner. Therefore, any contents without departing from the solutions of present invention, any simply modifications and equivalent alternations to the above embodiments according to the spirit of present invention, fall within the scope of present invention.

What is claimed is:

1. A switching power supply controller, comprising:
a switching power supply control device having a power supply terminal and detecting a voltage at the power supply terminal; and
a composite device coupled to the switching power supply control device, wherein the composite device has a first input, an input signal terminal, a second input, a first output and a second output, the composite device integrates therein a power transistor and a depletion transistor, wherein,
the power transistor has a gate coupled to the first input, a source coupled to the first output, and a drain coupled to the input signal terminal;
the depletion transistor has a gate coupled to the second input, a source coupled to the second output, and a drain coupled to the input signal terminal;
the first input, the second input and the second output are coupled to the switching power supply control device, the first input receives a driving signal generated by the switching power supply control device, and the input signal terminal receives an input signal of the switching power supply;
when the voltage at the power supply terminal is lower than a preset turn-off voltage, the switching power supply control device controls the depletion transistor in the composite device to supply a startup current to the power supply terminal; when the voltage at the power supply terminal rises above a preset turn-on voltage, the driving signal controls the power transistor in the composite device to supply a power output current to a main circuit of the switching power supply, and controls the depletion transistor in the composite device to cut off the startup current,
wherein the composite device comprises an epitaxial region, and
wherein the power transistor and the depletion transistor are formed in the epitaxial region.

2. The switching power supply controller of claim 1, wherein the epitaxial region is of a first doping type, and the epitaxial region acts as drains of the power transistor and the depletion transistor, and
wherein the composite device further comprises:
a power transistor well region and a depletion transistor well region formed in parallel on a front side of the epitaxial region, wherein the power transistor well region and the depletion transistor well region have a second doping type opposite to the first doping type;
a power transistor doped region of the first doping type formed within the power transistor well region, wherein the power transistor doped region acts as the source of the power transistor;
the gate of the power transistor formed on the front side of the epitaxial region, wherein the gate of the power transistor covers at least a portion of the power transistor doped region and extends onto the epitaxial region outside the power transistor well region;
a depletion transistor doped region of the first doping type formed within the depletion transistor well region, wherein the depletion transistor doped region acts as the source of the depletion transistor;
a depletion transistor channel region of the first doping type located within the depletion transistor well region, wherein the depletion transistor channel region extends from a boundary of the depletion transistor well region to a boundary of the depletion transistor doped region; and
the gate of the depletion transistor formed on the front side of the epitaxial region, wherein the gate of the depletion transistor covers the depletion transistor channel region and extends onto the epitaxial region outside the depletion transistor well region;
wherein the epitaxial region is shorted to a first electrode formed on a back side of the epitaxial region; the power transistor well region and the power transistor doped region are shorted via a second electrode, the depletion transistor well region and the depletion transistor doped region are shorted via a third electrode, wherein the second electrode and the third electrode are formed on the front side of the epitaxial region.

3. The switching power supply controller of claim 2, wherein the composite device further comprises an isolator for isolating the power transistor from the depletion transistor, wherein the isolator comprises:
a floating well region of the second doping type, wherein the floating well region is formed in parallel with the power transistor well region and the depletion transistor well region on the front side of the epitaxial region, and the floating well region is located between the power transistor well region and the depletion transistor well region;
a first gate formed on the front side of the epitaxial region, wherein the first gate covers at least a portion of the floating well region and at least a portion of the power transistor well region, the first gate further covers the epitaxial region between the floating well region and the power transistor well region; and
a second gate formed on the front side of the epitaxial region, wherein the second gate covers at least a portion of the floating well region and at least a portion of the depletion transistor well region, the second gate further covers the epitaxial region between the floating well region and the depletion transistor well region;
wherein the first gate and the power transistor well region are shorted, and the second gate and the depletion transistor well region are shorted.

4. The switching power supply controller of claim 3, wherein the first gate and the power transistor well region are shorted via the second electrode, and the second gate and the depletion transistor well region are shorted via the third electrode.

5. The switching power supply controller of claim 3, wherein the floating well region is formed with a same or different implantation process as the power transistor well region and the depletion transistor well region.

6. The switching power supply controller of claim 2, wherein the composite device further comprises an isolator for isolating the power transistor from the depletion transistor, wherein the isolator comprises:
- a floating well region of the second doping type, wherein the floating well region is formed in parallel with the power transistor well region and the depletion transistor well region on the front side of the epitaxial region, and the floating well region is located between the power transistor well region and the depletion transistor well region; and
- a dielectric layer formed on the front side of the epitaxial region, wherein the dielectric layer covers the floating well region and extends onto the epitaxial region outside the floating well region.

7. The switching power supply controller of claim 2, wherein the composite device further comprises an isolator for isolating the power transistor from the depletion transistor, wherein the isolator comprises:
- a floating well region of the second doping type, wherein the floating well region is formed in parallel with the power transistor well region and the depletion transistor well region on the front side of the epitaxial region, and the floating well region is located between the power transistor well region and the depletion transistor well region; and
- a second gate formed on the front side of the epitaxial region, wherein the second gate covers at least a portion of the floating well region and at least a portion of the depletion transistor well region, the second gate further covers the epitaxial region between the floating well region and the depletion transistor well region, wherein the second gate and the depletion transistor well region are shorted.

8. The switching power supply controller of claim 7, wherein the second gate and the depletion transistor well region are shorted via the third electrode.

9. The switching power supply controller of claim 8, wherein the second gate and the depletion transistor well region are shorted via the third electrode.

10. The switching power supply controller of claim 2, wherein the composite device further comprises an isolator for isolating the power transistor from the depletion transistor, wherein the isolator comprises:
- a second gate formed on the front side of the epitaxial region, wherein the second gate covers at least a portion of the power transistor well region and at least a portion of the depletion transistor well region, the second gate further covers the epitaxial region between the power transistor well region and the depletion transistor well region, wherein the second gate and the depletion transistor well region are shorted.

11. The switching power supply controller of claim 2, wherein the composite device further comprises an isolator for isolating the power transistor from the depletion transistor, wherein the isolator comprises:
- a first gate formed on the front side of the epitaxial region, wherein the first gate covers at least a portion of the power transistor well region and at least a portion of the depletion transistor well region, the first gate further covers the epitaxial region between the power transistor well region and the depletion transistor well region, wherein the first gate and the power transistor well region are shorted.

12. The switching power supply controller of claim 11, wherein the first gate and the power transistor well region are shorted via the second electrode.

13. The switching power supply controller of claim 2, wherein the composite device further comprises:
- a first leading-out region of the second doping type formed within the power transistor well region, wherein the first leading-out region and the power transistor doped region are shorted via the second electrode; and
- a second leading-out region of the second doping type formed within the depletion transistor well region, wherein the second leading-out region and the depletion transistor doped region are shorted via the third electrode.

14. The switching power supply controller of claim 2, wherein the power transistor and the depletion transistor share a common high-voltage ring.

15. The switching power supply controller of claim 1, wherein the switching power supply control device further has a high-voltage startup source, a high-voltage startup gate and a gate driving terminal, wherein the switching power supply control device comprises:
- an ON/OFF controller configured for detecting the voltage at the power supply terminal and generating a control signal based on the detection, wherein when the voltage at the power supply terminal is lower than the preset turn-off voltage, the control signal is invalid, and when the voltage at the power supply terminal is higher than the preset turn-on voltage, the control signal is valid;
- a PWM controller coupled to the ON/OFF controller and the gate driving terminal, and configured to generate the driving signal when the control signal is valid, wherein the driving signal is output via the gate driving terminal; and
- a high-voltage startup controller coupled to the power supply terminal, the high-voltage startup source and the high-voltage startup gate, wherein when the control signal is invalid, the high-voltage startup controller adjusts a voltage between the high-voltage startup source and the high-voltage startup gate to turn on the depletion transistor, such that the startup current flows through the high-voltage startup controller to the power supply terminal; when the control signal is valid, the high-voltage startup controller adjusts the voltage between the high-voltage startup source and the high-voltage startup gate to turn off the depletion transistor, so as to cut off the startup current.

16. The switching power supply controller of claim 15, wherein the ON/OFF controller further generates an internal operating voltage based on the detection, wherein the internal operating voltage is passed to the high-voltage startup controller, and the high-voltage startup controller utilizes the internal operating voltage to adjust the voltage between the high-voltage startup source and the high-voltage startup gate.

17. The switching power supply controller of claim 16, wherein the power transistor is an enhancement-mode MOS transistor, and the depletion transistor is a depletion-mode MOS transistor.

18. The switching power supply controller of claim 15, wherein the high-voltage startup controller comprises:
- a charging circuit coupled to the power supply terminal, the high-voltage startup source and the high-voltage startup gate; and
- a charging control circuit coupled to the high-voltage startup source and the high-voltage startup gate and receiving the control signal;
- wherein when the control signal is invalid, the charging control circuit adjusts the voltage between the high-voltage startup source and the high-voltage startup gate to turn on the depletion transistor, such that the startup current flows through the charging circuit to the power supply terminal; when the control signal is valid, the charging control circuit adjusts the voltage between the high-voltage startup source and the high-voltage startup gate to turn off the depletion transistor, so as to cut off the startup current.

19. The switching power supply controller of claim 18, wherein the charging control circuit comprises:
   a first diode, having an anode receiving an internal operating voltage;
   a first resistor, having a first terminal coupled to a cathode of the first diode, and having a second terminal coupled to the high-voltage startup source;
   a second resistor, having a first terminal coupled to the high-voltage startup source, and having a second terminal coupled to the high-voltage startup gate;
   a first PNP triode, having an emitter coupled to the high-voltage startup gate, and having a base coupled to a collector of the first PNP triode; and
   an NMOS field effect transistor, having a drain coupled to the collector of the first PNP triode, having a source coupled to ground, and having a gate receiving the control signal output by the ON/OFF controller;
   wherein the charging circuit comprises:
   a second PNP triode, having an emitter coupled to the high-voltage startup source, and having a base coupled to a collector of the second PNP triode;
   a third PNP triode, having an emitter coupled to the high-voltage startup source, and having a base coupled to the base of the second PNP triode;
   a second diode, having an anode coupled to the collector of the second PNP triode, and having a cathode coupled to the power supply terminal;
   a PMOS field effect transistor, having a gate coupled to the power supply terminal, and having a source coupled to the collector of the third PNP triode;
   the second resistor;
   a third resistor, having a first terminal coupled to the drain of the PMOS field effect transistor, and having a second terminal coupled to ground;
   the first PNP triode; and
   an NPN triode, having a base coupled to the drain of the PMOS field effect transistor, having a collector coupled to the collector of the first PNP triode, and having an emitter coupled to ground.

20. The switching power supply controller of claim 15, wherein the high-voltage startup controller comprises:
   a first resistor, having a first terminal coupled to the high-voltage startup source;
   a first NPN triode, having a collector coupled to a second terminal of the first resistor, and having a base coupled to the second terminal of the first resistor;
   a second NPN triode, having a collector coupled to the emitter of the first NPN triode, and having a base coupled to the emitter of the first NPN triode;
   a third NPN triode, having a collector coupled to the emitter of the second NPN triode, having a base coupled to the emitter of the second NPN triode, and having an emitter coupled to the power supply terminal;
   a first PMOS field effect transistor, having a drain coupled to the emitter of the first NPN triode, and having a source coupled to the power supply terminal;
   a second PMOS field effect transistor, having a source coupled to the power supply terminal, and having a gate receiving the control signal output by the ON/OFF controller;
   a third PMOS field effect transistor, having a source coupled to the power supply terminal, and having a gate coupled to the drain of the second PMOS field effect transistor;
   a fourth PMOS field effect transistor, having a source coupled to the power supply terminal, having a gate coupled to the drain of the third PMOS field effect transistor, and having a drain coupled to the high-voltage startup gate;
   a first NMOS field effect transistor, having a drain coupled to the drain of the second PMOS field effect transistor, having a gate receiving the control signal output by the ON/OFF controller, and having a source coupled to ground;
   a second NMOS field effect transistor, having a drain coupled to the drain of the third PMOS field effect transistor, having a gate coupled to the gate of the third PMOS field effect transistor, and having a source coupled to ground; and
   a third NMOS field effect transistor, having a drain coupled to the drain of the fourth PMOS field effect transistor, having a gate coupled to the drain of the fourth PMOS field effect transistor, and having a source coupled to ground.

21. The switching power supply controller of claim 15, wherein the switching power supply control device further has a constant current sampling terminal, wherein the switching power supply control device further comprises:
   a constant current controller coupled to the constant current sampling terminal and the PWM controller, for sampling the power output current flowing through the power transistor via the constant current sampling terminal and generating a constant current control signal, wherein the PWM controller generates the driving signal based on the constant current control signal to achieve a constant current output.

22. The switching power supply controller of claim 15, wherein the composite device further has a third output, and the composite device further integrates therein a sampling transistor,
   wherein the sampling transistor has a drain coupled to the input signal terminal, a gate coupled to the gate of the power transistor, and a source coupled to the third output;
   wherein the switching power supply control device further has a peak sampling terminal coupled to the third output, wherein the switching power supply control device further comprises:
   a peak controller coupled to the peak sampling terminal and the PWM controller, for sampling a peak current flowing through the power transistor via the peak sampling terminal and generating a peak control signal, wherein the PWM controller generates the driving signal based on the peak control signal to achieve peak control.

23. The switching power supply controller of claim 22, wherein the epitaxial region is of a first doping type, and the epitaxial region acts as drains of the power transistor and the depletion transistor, and wherein the composite device further comprises:
an epitaxial region of the first doping type, wherein the epitaxial region acts as the drains of the power transistor, the depletion transistor and the sampling transistor;
a power transistor well region, a depletion transistor well region and a sampling transistor well region formed in parallel on a front side of the epitaxial region, wherein the power transistor well region, the depletion transistor well region and the sampling transistor well region have a second doping type opposite to the first doping type;
a power transistor doped region of the first doping type formed within the power transistor well region, wherein the power transistor doped region acts as the source of the power transistor;
a gate of the power transistor formed on the front side of the epitaxial region, wherein the gate of the power transistor covers at least a portion of the power transistor doped region and extends onto the epitaxial region outside the power transistor well region;
a depletion transistor doped region of the first doping type formed within the depletion transistor well region, wherein the depletion transistor doped region acts as the source of the depletion transistor;
a depletion transistor channel region of the first doping type located within the depletion transistor well region, wherein the depletion transistor channel region extends from a boundary of the depletion transistor well region to a boundary of the depletion transistor doped region;
a gate of the depletion transistor formed on the front side of the epitaxial region, wherein the gate of the depletion transistor covers the depletion transistor channel region and extends onto the epitaxial region outside the depletion transistor well region;
a sampling transistor doped region of the first doping type formed within the sampling transistor well region, wherein the sampling transistor doped region acts as the source of the sampling transistor;
the gate of the sampling transistor formed on the front side of the epitaxial region, wherein the gate of the sampling transistor covers at least a portion of the sampling transistor doped region and extends onto the epitaxial region outside the sampling transistor well region;
wherein the epitaxial region is shorted to a first electrode formed on a back side of the epitaxial region; the power transistor well region and the power transistor doped region are shorted via a second electrode, the depletion transistor well region and the depletion transistor doped region are shorted via a third electrode, the sampling transistor well region and the sampling transistor doped region are shorted via a fourth electrode, wherein the second electrode, the third electrode and the fourth electrode are formed on the front side of the epitaxial region.

24. The switching power supply controller of claim 1, wherein the power transistor is an enhancement-mode MOS transistor, and the depletion transistor is a depletion-mode MOS transistor.

25. A switching power supply, comprising:
the switching power supply controller of claim 1; and
a main circuit coupled to the switching power supply controller.

26. The switching power supply of claim 25, wherein the main circuit has a flyback structure or a boost structure.

27. The switching power supply of claim 26, wherein the main circuit comprises:

a transformer, having a primary winding with a dotted terminal receiving the input signal of the switching power supply, and with a synonym terminal coupled to the input signal terminal of the composite device;
an output rectifier diode, having an anode coupled to a synonym terminal of a secondary winding of the transformer, and having a cathode coupled to an output of the switching power supply;
an output filter capacitor, having a first terminal coupled to the cathode of the output rectifier diode, and having a second terminal coupled to the dotted terminal of the secondary winding and to ground;
an auxiliary winding diode, having an anode coupled to a synonym terminal of an auxiliary winding of the transformer, and having a cathode coupled to the power supply terminal, wherein a dotted terminal of the auxiliary winding is coupled to ground; and
a startup capacitor, having a first terminal coupled to the power supply terminal, and having a second terminal coupled to ground.

28. The switching power supply of claim 27, wherein when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by the input signal of the switching power supply via the primary winding and the auxiliary winding of the transformer, the auxiliary winding diode and the startup capacitor, to complete the startup of the switching power supply.

29. The switching power supply of claim 26, wherein the main circuit comprises:
an inductor, having a first terminal coupled to an output of the switching power supply, and having a second terminal coupled to a ground terminal of the switching power supply control device in the switching power supply controller and to the first output of the composite device;
a first diode, having an anode coupled to the first terminal of the inductor;
a second diode, having an anode coupled to a cathode of the first diode, and having a cathode coupled to the power supply terminal;
a first capacitor, having a first terminal coupled to the cathode of the first diode, and having a second terminal coupled to the second terminal of the inductor;
a second capacitor, having a first terminal coupled to the power supply terminal, and having a second terminal coupled to the second terminal of the inductor;
a third diode, having a cathode coupled to the second terminal of the inductor, and having an anode coupled to ground; and
a third capacitor, having a first terminal coupled to the output of the switching power supply, and having a second terminal coupled to ground.

30. The switching power supply of claim 29, wherein when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by the output of the switching power supply via the first diode, the first capacitor, the second diode and the second capacitor, to complete the startup of the switching power supply.

31. The switching power supply of claim 25, wherein the main circuit comprises:
  a transformer, having a primary winding with a dotted terminal receiving the input signal of the switching power supply, and with a synonym terminal coupled to the input signal terminal of the composite device;
  an output rectifier diode, having an anode coupled to a synonym terminal of a secondary winding of the transformer, and having a cathode coupled to an output of the switching power supply;
  an output filter capacitor, having a first terminal coupled to the cathode of the output rectifier diode, and having a second terminal coupled to the dotted terminal of the secondary winding and to ground;
  an auxiliary winding diode, having an anode coupled to a synonym terminal of an auxiliary winding of the transformer, and having a cathode coupled to the power supply terminal, wherein a dotted terminal of the auxiliary winding is coupled to ground;
  a startup capacitor, having a first terminal coupled to the power supply terminal, and having a second terminal coupled to ground; and
  a sampling resistor, having a first terminal coupled to the first output of the composite device and to a constant current sampling terminal of the switching power supply control device, and having a second terminal coupled to a ground terminal of the switching power supply control device and to ground.

32. The switching power supply of claim 31, wherein when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by the input signal of the switching power supply via the primary winding and the auxiliary winding of the transformer, the auxiliary winding diode and the startup capacitor, to complete the startup of the switching power supply.

33. The switching power supply of claim 25, wherein the main circuit comprises:
  an input diode, having a cathode receiving the input signal of the switching power supply, and an anode coupled to the input signal terminal of the composite device;
  a transformer, having a primary winding with a synonym terminal coupled to the input signal terminal of the composite device;
  a secondary winding diode, having an anode coupled to a synonym terminal of a secondary winding of the transformer, and having a cathode coupled to the power supply terminal, wherein a dotted terminal of the secondary winding is coupled to ground;
  an output filter capacitor, having a first terminal coupled to the cathode of the input diode, and having a second terminal coupled to a dotted terminal of the primary winding of the transformer;
  a startup capacitor, having a first terminal coupled to the power supply terminal, and having a second terminal coupled to ground; and
  a sampling resistor, having a first terminal coupled to the first output of the composite device and to a constant current sampling terminal of the switching power supply control device, and having a second terminal coupled to a ground terminal of the switching power supply control device and to ground.

34. The switching power supply of claim 33, wherein when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by an output of the switching power supply via the primary winding and the secondary winding of the transformer, the secondary winding diode and the startup capacitor, to complete the startup of the switching power supply.

35. The switching power supply of claim 25, wherein the main circuit comprises:
  a sampling resistor, having a first terminal coupled to the first output of the composite device and to a ground terminal of the switching power supply device, and having a second terminal coupled to a constant current sampling terminal of the switching power supply control device;
  a transformer, having a primary winding with a dotted terminal coupled to the second terminal of the sampling resistor;
  a secondary winding diode, having an anode coupled to a synonym terminal of a secondary winding of the transformer;
  a first resistor, having a first terminal coupled to a cathode of the secondary winding diode, and having a second terminal coupled to the power supply terminal;
  a first capacitor, having a first terminal coupled to the second terminal of the first resistor;
  an output rectifier diode, having a cathode coupled to a second terminal of the first capacitor, the first terminal of the sampling resistor and a dotted terminal of the secondary winding, and having an anode coupled to ground; and
  an output filter capacitor, having a first terminal coupled to a synonym terminal of the primary winding of the transformer, and having a second terminal coupled to ground.

36. The switching power supply of claim 35, wherein when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by an output of the switching power supply via the primary winding and the secondary winding of the transformer, the secondary winding diode, the first resistor and the first capacitor, to complete the startup of the switching power supply.

37. The switching power supply of claim 25, wherein the main circuit comprises:
- a sampling resistor, having a first terminal coupled to the first output of the composite device and to a ground terminal of the switching power supply device, and having a second terminal coupled to a constant current sampling terminal of the switching power supply control device;
- a transformer, having a primary winding with a dotted terminal coupled to the second terminal of the sampling resistor and with a synonym terminal coupled to ground;
- a secondary winding diode, having an anode coupled to a synonym terminal of a secondary winding of the transformer, wherein a dotted terminal of the secondary winding is coupled to the first terminal of the sampling resistor;
- a first resistor, having a first terminal coupled to a cathode of the secondary winding diode, and having a second terminal coupled to the power supply terminal;
- a first capacitor, having a first terminal coupled to the second terminal of the first resistor, and having a second terminal coupled to the first terminal of the sampling resistor;
- an output rectifier diode, having a cathode coupled to the dotted terminal of the secondary winding; and
- an output filter capacitor, having a first terminal coupled to an anode of the output rectifier diode, and having a second terminal coupled to ground.

38. The switching power supply of claim 37, wherein when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the composite device in the switching power supply controller cuts off the startup current, and the power supply terminal is powered instead by an output of the switching power supply via the output rectifier diode, the sampling resistor, the primary winding and the secondary winding of the transformer, the secondary winding diode, the first resistor and the first capacitor, to complete the startup of the switching power supply.

39. The switching power supply of claim 25, wherein the main circuit comprises:
- a transformer, having a primary winding with a dotted terminal receiving the input signal of the switching power supply, and with a synonym terminal coupled to the input signal terminal of the composite device;
- an output rectifier diode, having an anode coupled to a synonym terminal of a secondary winding of the transformer, and having a cathode coupled to an output of the switching power supply;
- an output filter capacitor, having a first terminal coupled to the cathode of the output rectifier diode, and having a second terminal coupled to the dotted terminal of the secondary winding and to ground;
- an auxiliary winding diode, having an anode coupled to a synonym terminal of an auxiliary winding of the transformer, and having a cathode coupled to the power supply terminal, wherein a dotted terminal of the auxiliary winding is coupled to ground; and
- a startup capacitor, having a first terminal coupled to the power supply terminal, and having a second terminal coupled to ground.

40. The switching power supply of claim 39, wherein when the switching power supply initiates the startup, the voltage at the power supply terminal is lower than the preset turn-off voltage, and the composite device in the switching power supply controller supplies the startup current to the power supply terminal, such that the voltage at the power supply terminal rises; when the voltage at the power supply terminal rises above the preset turn-on voltage, the switching circuit in the switching power supply controller cuts off the startup current, and the power supply terminal is powered instead by the input signal of the switching power supply via the primary winding and the auxiliary winding of the transformer, the auxiliary winding diode and the startup capacitor, to complete the startup of the switching power supply.

* * * * *